United States Patent
Kato et al.

(10) Patent No.: US 12,146,955 B2
(45) Date of Patent: Nov. 19, 2024

(54) RANGE-INFORMATION ACQUIRING APPARATUS, RANGE-INFORMATION ACQUIRING METHOD, AND NON-TRANSITORY COMPUTER-READABLE MEDIUM

(71) Applicant: Panasonic Intellectual Property Management Co., Ltd., Osaka (JP)

(72) Inventors: Yumiko Kato, Osaka (JP); Satoshi Sato, Kyoto (JP); Yasuhisa Inada, Osaka (JP); Yoshihide Sawada, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 955 days.

(21) Appl. No.: 17/171,934

(22) Filed: Feb. 9, 2021

(65) Prior Publication Data
US 2021/0165096 A1 Jun. 3, 2021

Related U.S. Application Data

(63) Continuation of application No. PCT/JP2019/040822, filed on Oct. 17, 2019.

(30) Foreign Application Priority Data

Dec. 6, 2018 (JP) ................ 2018-229250

(51) Int. Cl.
*G01C 3/08* (2006.01)
*G01S 7/4912* (2020.01)
*G01S 17/18* (2020.01)

(52) U.S. Cl.
CPC ............ *G01S 17/18* (2020.01); *G01S 7/4917* (2013.01); *G01S 7/4918* (2013.01)

(58) Field of Classification Search
CPC ............................. G01S 17/18; G01S 7/4918
See application file for complete search history.

(56) References Cited

U.S. PATENT DOCUMENTS 6,246,502 B1 6/2001 Okada et al.
2008/0043218 A1 2/2008 Murayama
(Continued)

FOREIGN PATENT DOCUMENTS

JP 8-152320 6/1996
JP 2004028602 * 1/2004 ............ G01S 17/88
(Continued)

OTHER PUBLICATIONS

International Search Report of PCT application No. PCT/JP2019/040822 dated Jan. 21, 2020.
(Continued)

*Primary Examiner* — Mark Hellner
(74) *Attorney, Agent, or Firm* — Rimon P.C.

(57) ABSTRACT

A range-information acquiring apparatus includes a light source, an image sensor, a control circuit, and a signal processing circuit. The control circuit causes the light source to emit first light toward a scene and subsequently emit second light toward the scene, the first light having a first spatial distribution, the second light having a second spatial distribution. The control circuit causes at least a portion of plural photodetector elements of the photodetector device to detect first reflected light and second reflected light in the same exposure period, the first reflected light being caused by reflection of the first light from the scene, the second reflected light being caused by reflection of the second light from the scene. The signal processing circuit generates range data based on photodetection data output from the photodetector elements of the photodetector device.

14 Claims, 24 Drawing Sheets

(56) References Cited

U.S. PATENT DOCUMENTS

| | | |
|---|---|---|
| 2011/0157354 A1 | 6/2011 | Kawahito |
| 2013/0088726 A1 | 4/2013 | Goyal et al. |
| 2015/0378011 A1 | 12/2015 | Owechko |
| 2016/0146595 A1 | 5/2016 | Boufounos et al. |
| 2017/0074976 A1 | 3/2017 | Takahashi et al. |
| 2018/0224709 A1 | 8/2018 | Inada et al. |
| 2018/0284241 A1 | 10/2018 | Campbell et al. |
| 2018/0327699 A1 | 11/2018 | Ota et al. |
| 2018/0329063 A1 | 11/2018 | Takemoto et al. |
| 2019/0025432 A1 | 1/2019 | Mano |
| 2019/0120942 A1 | 4/2019 | Zhang et al. |
| 2019/0124080 A1 | 4/2019 | Caluwaert |
| 2019/0178988 A1 | 6/2019 | Englard et al. |
| 2020/0025882 A1* | 1/2020 | Watanabe ............... G01S 17/10 |
| 2020/0097702 A1 | 3/2020 | Saitou et al. |
| 2020/0132847 A1 | 4/2020 | Hillard et al. |

FOREIGN PATENT DOCUMENTS

| | | |
|---|---|---|
| JP | 2005-140685 | 6/2005 |
| JP | 2008-046047 | 2/2008 |
| JP | 2010-032425 | 2/2010 |
| JP | 2010-107448 A | 5/2010 |
| JP | 2010-256291 | 11/2010 |
| JP | 2011-133271 | 7/2011 |
| JP | 2013-016591 | 1/2013 |
| JP | 2013-156138 | 8/2013 |
| JP | 2016-508235 | 3/2016 |
| JP | 2016-099346 | 5/2016 |
| JP | 2018-160049 A | 10/2018 |
| WO | 2014/110017 | 7/2014 |
| WO | 2017/073737 A1 | 5/2017 |
| WO | 2017/110414 | 6/2017 |
| WO | 2017/141957 A1 | 8/2017 |

OTHER PUBLICATIONS

Norio Matsumoto, Nikkei xTech/Nikkei Electronics, News Commentary, "A New Technology for Non-mechanical LiDAR with Discrete Selection of the Ranging Points", Nikkei XTech, Feb. 23, 2018 (Partial Translation).
English Translation of Chinese Search Report dated Mar. 14, 2024 for the related Chinese Patent Application No. 201980048155.3.
International Search Report of PCT application No. PCT/JP2019/040823 dated Jan. 21, 2020.
Non-Final Office Action dated Dec. 20, 2023 issued in U.S. Appl. No. 17/163,662.
Final Office Action dated Mar. 28, 2024 issued in U.S. Appl. No. 17/163,662.

* cited by examiner

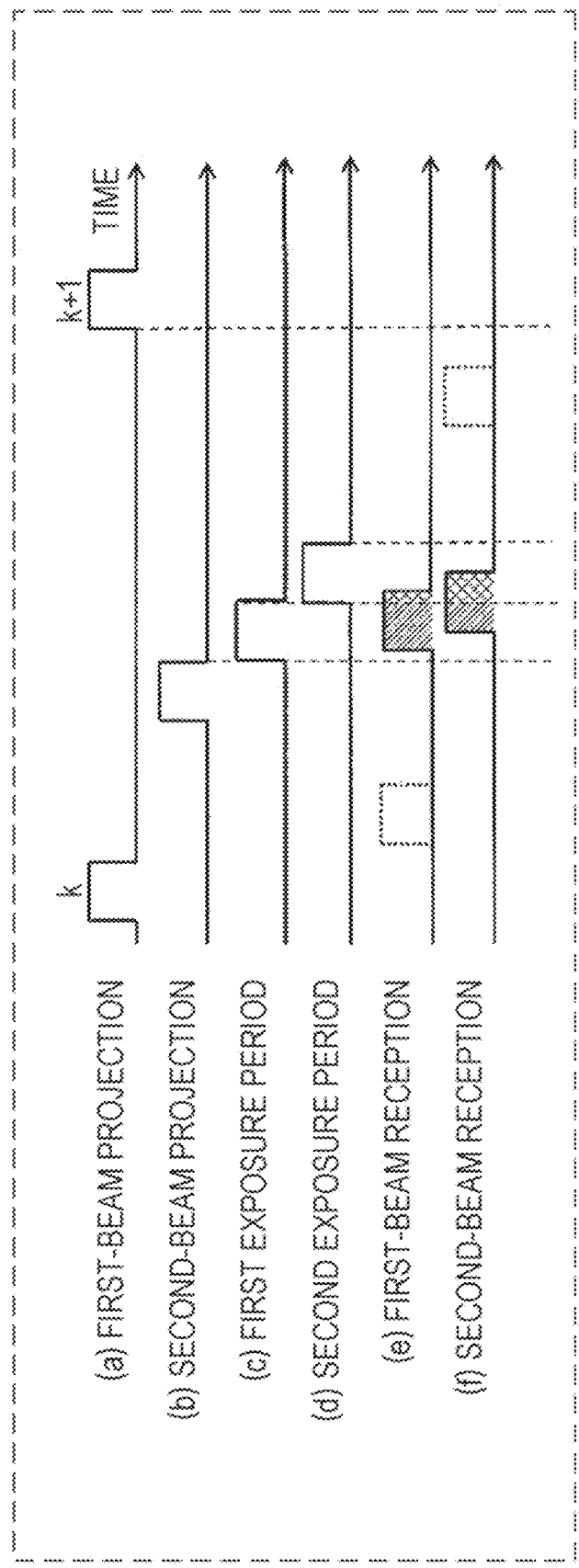

RANGE-INFORMATION ACQUIRING APPARATUS, RANGE-INFORMATION ACQUIRING METHOD, AND NON-TRANSITORY COMPUTER-READABLE MEDIUM

BACKGROUND

1. Technical Field

The present disclosure relates to a range-information acquiring apparatus, a range-information acquiring method, and a non-transitory computer-readable medium.

Various devices capable of scanning a space with light have been proposed in related art.

Japanese Unexamined Patent Application Publication (Translation of PCT Application) No. 2016-508235 discloses an optical phased array with plural two-dimensionally arranged nano-photonic antenna elements. Each antenna element is optically coupled to a phase shifter. In the optical phased array, a coherent light beam is guided by a waveguide to each antenna element, and the phase of the light beam is shifted by the phase shifter. This configuration makes it possible to change the amplitude distribution of a far-field radiation pattern.

Japanese Unexamined Patent Application Publication No. 2013-016591 discloses an optical deflection element. The optical deflection element includes an optical waveguide layer in which light is guided, a first distribution Bragg reflection mirror provided on the upper and lower surfaces of the optical waveguide layer, a light incidence port for allowing light to enter the waveguide, and a light emission port provided on the surface of the waveguide to allow emission of light entering through the light incidence port and guided within the waveguide.

Japanese Unexamined Patent Application Publication No. 2016-099346, U.S. Patent Application Publication No. 2013/0088726, and U.S. Patent Application Publication No. 2015/0378011 each disclose an apparatus that emits light spatially modulated in a random fashion, receives the reflection of the emitted light to obtain a signal, and applies analytical signal processing to the signal to thereby generate a range image.

Japanese Unexamined Patent Application Publication No. 2013-156138 discloses a scanning method that includes dividing a scene into plural regions, and emitting beams of light that, for each region, differ in density, that is, differ in the frequency with which the beams are radiated into a two-dimensional space.

U.S. Patent Application Publication No. 2018/224709 discloses a light-emitting device capable of emitting light in any given direction by use of an optical waveguide called a slow-light waveguide.

SUMMARY

One non-limiting and exemplary embodiment provides a novel technique for generating range information for a scene of interest with relatively low energy usage.

In one general aspect, the techniques disclosed here feature a range-information acquiring apparatus including a light source, a photodetector device including plural photodetector elements, a control circuit that controls the light source and the photodetector device, and a signal processing circuit. The control circuit causes the light source to emit first light toward a scene and subsequently emit second light toward the scene, the first light having a first spatial distribution, the second light having a second spatial distribution. The control circuit further causes at least a portion of the photodetector elements of the photodetector device to detect first reflected light and second reflected light in the same exposure period, the first reflected light being caused by reflection of the first light from the scene, the second reflected light being caused by reflection of the second light from the scene. The signal processing circuit generates and outputs range data based on photodetection data output from the photodetector elements of the photodetector device, the range data being derived from the first reflected light and the second reflected light.

According to an aspect of the present disclosure, range information of a scene of interest can be acquired with relatively low energy usage.

It should be noted that general or specific embodiments may be implemented as a system, an apparatus or device, a method, an integrated circuit, a computer program, a computer-readable storage medium or other such storage medium, or any selective combination thereof. Examples of computer-readable storage media may include non-volatile storage media such as a Compact Disc-Read Only Memory (CD-ROM). The apparatus or device may be made up of one or more apparatuses or devices. If the apparatus or device is made up of two or more apparatuses or devices, the two or more apparatuses or devices may be disposed in a single piece of equipment or disposed separately in two or more discrete pieces of equipment. As used in the specification and the claims, the term "apparatus" or "device" can mean not only a single apparatus or device but also a system including plural apparatuses or devices.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 21 illustrates operation in accordance with the modification of Embodiment 1;

DETAILED DESCRIPTION

Figure 1:
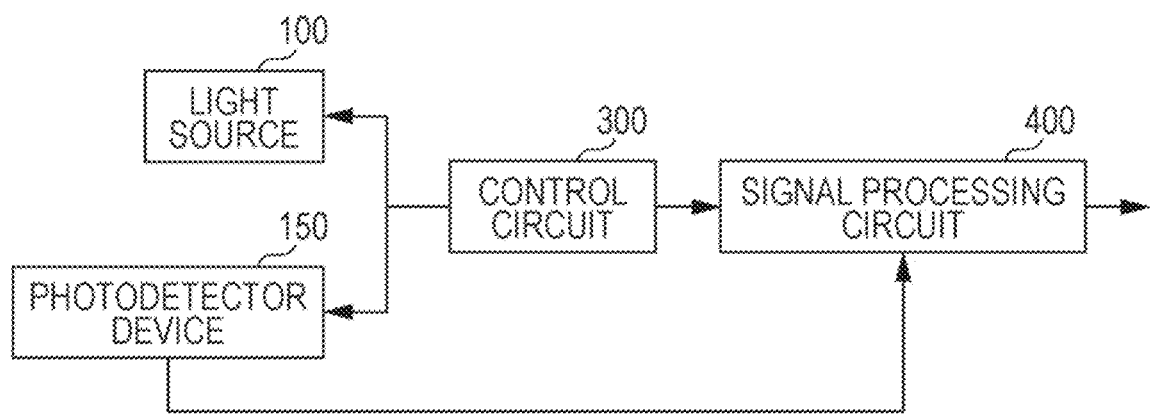
FIG. 1 is a block diagram illustrating a schematic configuration of a range-information acquiring apparatus according to Embodiment 1.

Embodiments of the present disclosure will be described below in specific detail with reference to the drawings. Embodiments described below each represent a generic or specific example. Specific details set forth in the following description of embodiments, such as numerical values, shapes, components, the placement and connection of components, steps, and the order of steps, are for illustrative purposes only and not intended to limit the scope of the present disclosure. Those components in the following description of embodiments which are not cited in the independent claim representing the most generic concept of the present disclosure will be described as optional components. It is to be understood that the drawings are schematic and not necessarily to exact scale. Further, in the drawings, the same or like reference signs are sometimes used to designate substantially the same or like components to avoid or simplify repeated descriptions.

According to the present disclosure, each circuit, unit, apparatus or device, component, or part, or each functional block in block diagrams may, in whole or in part, be implemented as one or more electronic circuits including, for example, a semiconductor device, a semiconductor integrated circuit (IC), or a large scale integration (LSI). An LSI or an IC may be integrated in a single chip or may be a combination of plural chips. For example, functional blocks other than a storage element may be integrated in a single chip. Although herein called an LSI or IC, each such electronic circuit is called differently depending on the degree of integration, such as a system LSI, a very large scale integration (VLSI), or ultra large scale integration (ULSI). A field programmable gate array (FPGA) that is programmed after manufacture of an LSI, or a reconfigurable logic device that allows reconfiguration of connections inside an LSI or allows set-up of circuit segments inside an LSI may be used for the same purpose.

Further, the function or operation of each circuit, unit, apparatus or device, component, or part may, in whole or in part, be implemented by software processing. In this case, the software is stored on one or more non-transitory storage media such as ROMs, optical discs, or hard disk drives, and when the software is executed by a processor, a function specified by the software is executed by the processor and peripheral devices. A system, or an apparatus or device may include one or more non-transitory storage media on which the software is stored, the processor, and a required hardware device, which is, for example, an interface.

Embodiment 1

FIG. 1 is a block diagram illustrating a schematic configuration of a range-information acquiring apparatus according to Embodiment 1. The range-information acquiring apparatus includes a light source 100, a photodetector device 150, a control circuit 300, and a signal processing circuit 400.

The light source 100 may be, for example, capable of simultaneously emitting plural light beams in different directions. The photodetector device 150 includes plural photodetector elements. The plural photodetector elements correspond one-to-one to plural pixels. A photodetector element will be herein sometimes referred to as pixel. The photodetector device 150 outputs photodetection data responsive to the amount of light received by each photodetector element during a specified exposure period. The photodetector device 150 may be, for example, an image sensor including plural one- or two-dimensionally arranged photodetector elements. The control circuit 300 controls the light source 100 and the photodetector device 150. The signal processing circuit 400 generates and outputs range data based on the photodetection data output from the photodetector device 150.

The following provides an overview of operations executed by the control circuit 300 according to Embodiment 1.

(1) The control circuit 300 causes the light source 100 to emit first light having a first spatial distribution toward a scene. The first light may include plural first light beams, or may be a single light beam having a single continuous pattern.

(2) The control circuit 300 causes the light source 100 to emit second light having a second spatial distribution toward the scene. The second light may include plural second light beams, or may be a single light beam having a single continuous pattern.

The first light may have a maximum range different from the maximum range of the second light. For example, the second light may have a lower energy than the first beam per unit area on an irradiated surface located at a predetermined distance from the light source. Another exemplary method for making the first light and the second light differ in maximum range may be to make the first light and the second light differ in wavelength. For example, a wavelength with a higher atmospheric absorption coefficient than the wavelength of the first light may be selected as the wavelength of the second light. As will be described later, the first light and the second light may have the same maximum range.

In Embodiment 1, the second spatial distribution differs from the first spatial distribution. As used herein, the term "spatial distribution" of a light beam means a spatial range in three dimensions (i.e., distance, direction, and angular range) that the light beam can reach. Even if the first light and the second light are emitted in the same direction and in the same angular range, if the first light and the second light differ in their maximum range, then it can be said that the first spatial distribution and the second spatial distribution differ from each other. The term "two-dimensional spatial distribution" means a spatial distribution with the direction and angular range of light, which represent two of the three dimensions of the "spatial distribution" excluding the dimension representing the distance that the light beam can reach. As will be described later, the first spatial distribution and the second spatial distribution may be the same. As used herein, the term "radiant intensity" refers to radiant energy radiated from a point-like radiation source in a "given direction" per unit time, which is obtained by differentiating the radiant flux of radiated light with respect to a solid angle as viewed from the radiation source, that is, the magnitude of the angular range of divergence of light. As used herein, the term "maximum range of light" refers to the farthest distance that light with a predetermined photosynthetic photon flux density can reach from the location of the light source, provided that there is no obstacle.

(3) The control circuit 300 causes at least a portion of the photodetector elements of the photodetector device 150 to receive first reflected light and second reflected light in the same exposure period, the first reflected light being caused by reflection of the first light from a scene, the second reflected light being caused by reflection of the second light from the scene.

The signal processing circuit 400 generates and outputs range data derived from the first reflected light and the second reflected light, based on photodetection data output from the photodetector elements of the photodetector device 150. As used herein, the term "range data" means various data representing the absolute distance of a measurement point from a reference point, or the relative distance between measurement points. For example, the range data may be range image data with range information attached to each pixel of two-dimensional image data, the range information representing the distance of a measurement point corresponding to the pixel. Alternatively, the range data may be three-dimensional point group data representing three-dimensional coordinates of each measurement point. The range data may not necessarily be data that directly represents distance, but may be the very sensor data acquired for ranging, that is, raw data. The raw data is, for example, brightness data detected by each photodetector element of the photodetector device 150. The raw data may be handled as range data together with additional data required for calculating distance. An example of such additional data is data representing the timing and duration of exposure of each photodetector element, which is data required for the ToF-based distance calculation described later.

According to the above-mentioned configuration, the first light and the second light do not need to cover the entire scene. The above-mentioned configuration thus makes it possible to reduce the energy of emitted light. Further, ranging at relatively short distance range and ranging at relatively long distance range can be performed simultaneously. This makes it possible to reduce the time required for ranging in comparison to when ranging at short range and ranging at long range are performed individually.

The exposure period may be set as follows: the exposure period does not include a time at which a portion of the first reflected light arrives at the photodetector device, the portion of the first reflected light being caused by reflection at a position in the scene located at a first distance from the photodetector device; the exposure period includes a time at which another portion of the first reflected light arrives at the photodetector device, the other portion of the first reflected light being caused by reflection at a position located at a second distance from the photodetector device, the second distance being greater than the first distance; and the exposure period includes a time at which a portion of the second reflected light arrives at the photodetector device, the portion of the second reflected light being caused by reflection at a position located at the first distance from the photodetector device. This configuration makes it possible to ensure that: the first reflected light from an object located at the first distance relatively close to the photodetector device is not detected; the second reflected light from the object at the second distance is detected; and the first reflected light from an object located at a second distance relatively far from the photodetector device is detected. This makes it possible to simultaneously perform ranging of an object located at a short distance and ranging of an object located at a long distance.

Figure 2:
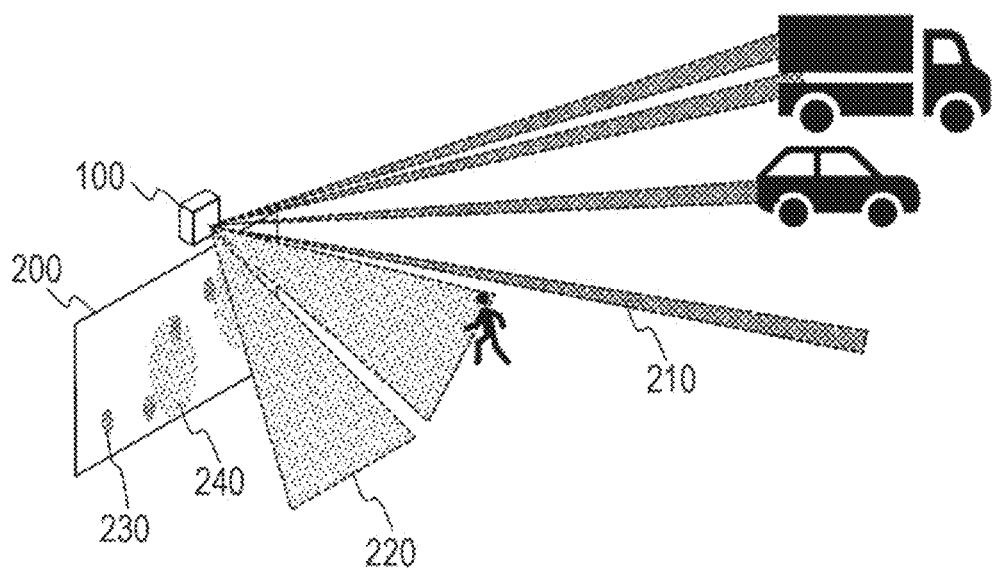
FIG. 2 schematically illustrates an exemplary scene for which a range-information acquiring apparatus is used.

FIG. 2 schematically illustrates an exemplary usage scene according to Embodiment 1. In the present example, the photodetector device 150 is implemented by an image sensor 200 that acquires a two-dimensional image. The light source 100 sequentially emits the first light including plural first light beams 210, and the second light including plural second light beams 220. Each first light beam 210 has a relatively high energy per unit area on an irradiated surface located at a predetermined distance from the light source, and reaches far. By contrast, each second light beam 220 has a relatively low energy per unit area on the irradiated surface, and does not reach very far. In the following description, each first light beam 210 will be sometimes referred to as "long-range beam", and each second light beam 220 will be sometimes referred to as "short-range beam". In the example illustrated in FIG. 2, both light beams have substantially the same energy as a whole. Consequently, each second light beam 220 has a divergence angle greater than the divergence angle of each first light beam 210.

Although FIG. 2 depicts an example with four first light beams 210 and two second light beams 220, in actuality, more light beams 210 and 220 may be emitted.

The image sensor 200 receives first reflected light 230 and second reflected light 240 in the same exposure period, the first reflected light 230 being caused by reflection of the first light from a scene, the second reflected light being caused by reflection of the second light from the scene. The signal processing circuit 400 generates and outputs range data based on photodetection data output from the image sensor 200, the range data being derived from the first reflected light and the second reflected light.

The number of the first light beams 210 is less than the number of light beams required for covering the entire scene to be captured. Likewise, the number of the second light beams 220 is less than the number of light beams required for covering the entire scene to be captured. In other words, the first light beams 210 and the second light beams 220 are both "sparse light beams".

The photodetector elements of the image sensor 200 may include the following photodetector elements: plural first photodetector elements that receive the first reflected light and do not receive the second reflected light; plural second photodetector elements that receive the second reflected light and do not receive the first reflected light; and plural third photodetector elements that receive neither the first reflected light nor the second reflected light. Of all the pixels, plural pixels corresponding to the third photodetector elements are each located at a position corresponding to a portion of the entire scene (see FIG. 5). The signal processing circuit is capable of estimating range information for the above-mentioned portion of the entire scene. That is, the signal processing circuit generates range data by estimating, based on photodetector data, range information representing the distance at the position of each of the pixels corresponding to the third photodetector elements. The signal processing circuit 400 is capable of generating range data from photodetection data by use of preset weight information. The weight information is determined based on the first spatial distribution and the second spatial distribution. Details of signal processing using the weight information will be given later.

The range-information acquiring apparatus according to Embodiment 1 generates range data by use of sparse light beams. This makes it possible to acquire range information with reduced power consumption in comparison to use of light beams that cover the entire scene to be captured.

The configuration and operation according to Embodiment 1 will be described more specifically below.

1-1. Configuration of Range-Information Acquiring Apparatus

Figure 3:
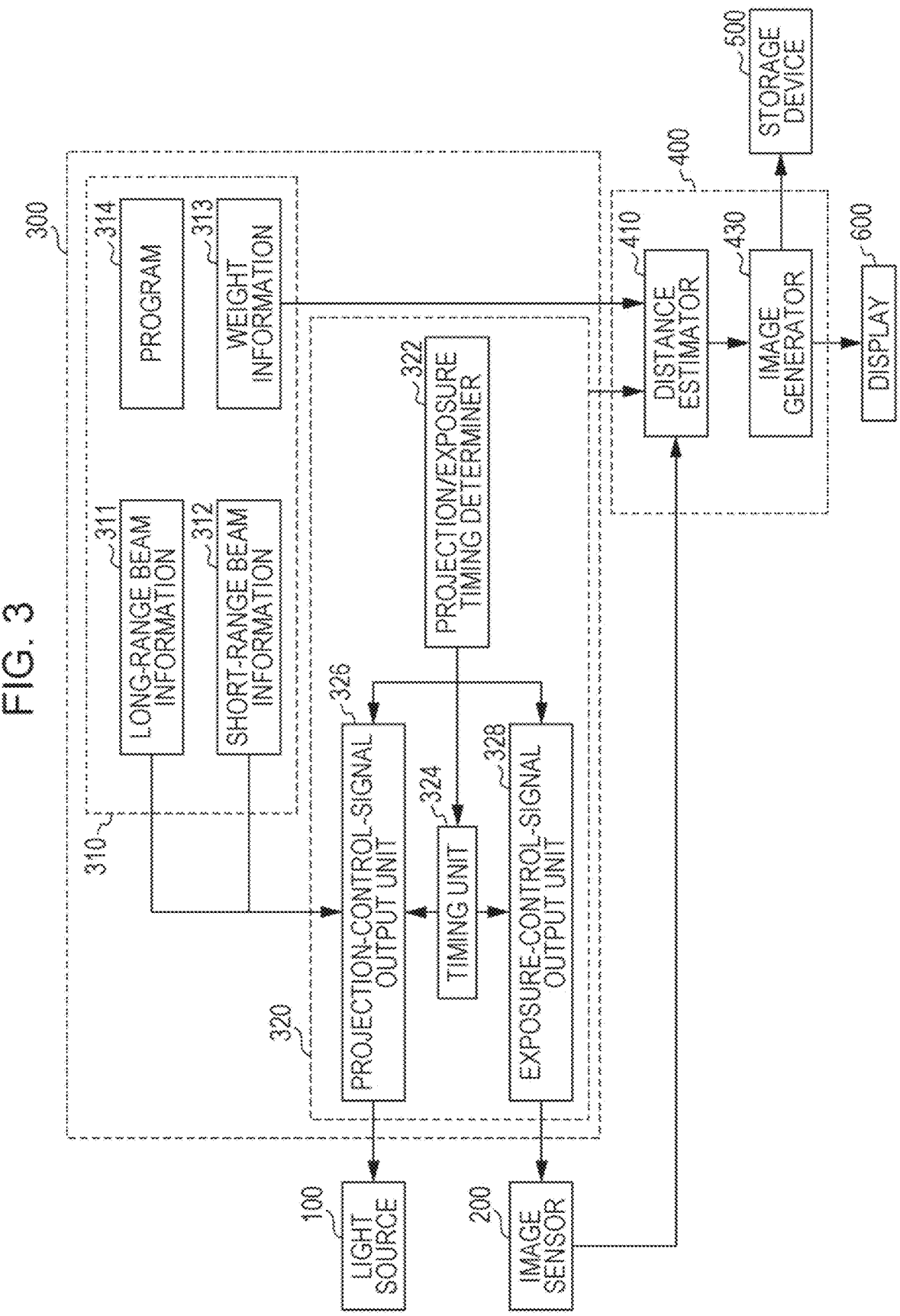
FIG. 3 is a block diagram illustrating an exemplary configuration of the range-information acquiring apparatus according to Embodiment 1.

FIG. 3 is a block diagram illustrating an exemplary configuration of the range-information acquiring apparatus according to Embodiment 1. The range-information acquiring apparatus illustrated in FIG. 3 includes the light source 100, the image sensor 200, the control circuit 300, the signal processing circuit 400, a storage device 500, and a display 600. The control circuit 300 includes a storage medium 310, and a processor 320.

The light source 100 may be, for example, a light-emitting device that emits laser light. The light source 100 emits plural long-range beams that reach farther, and plural short-range beams with a maximum range shorter than the maximum range of the long-range beams. The light source 100 emits the long-range beams and the short-range beams in, for example, random directions. Each long-range beam may have a maximum range of, for example, 100 m to 200 m. Each short-range beam may have a maximum range of, for example, 0 m to 100 m. The maximum ranges of these light beams are not limited to the above-mentioned exemplary values but may be set to any given values.

The image sensor 200 includes plural two-dimensionally arranged photodetector elements. Each photodetector element may include a photoelectric conversion element such as a photodiode. Each photodetector element performs photoelectric conversion upon receiving light, and outputs an electrical signal responsive to the amount of received light.

The control circuit 300 controls the respective operations of the light source 100, the image sensor 200, and the signal processing circuit 400. The control circuit 300 may be implemented as an electronic circuit such as a microcontroller unit (MCU). The control circuit 300 illustrated in FIG. 3 includes the processor 320, and the storage medium 310. The processor 320 may be implemented as, for example, a central processing unit (CPU). Examples of the storage medium 310 may include a non-volatile memory such as a read only memory (ROM), and a volatile memory such as a random access memory (RAM). The storage medium 310 stores a computer program 314 that is executed by the processor 320. The processor 320 may execute the program 314 to thereby execute operations described later.

The control circuit 300 determines the timing of light beam projection by the light source 100, and the timing of exposure of the image sensor 200. In accordance with the determined timings, the control circuit 300 outputs a projection control signal and an exposure control signal. The projection control signal is generated in accordance with long-range beam information 311 and short-range beam information 312, which are pre-stored on the storage medium 310. The long-range beam information 311 may include information related to the direction of emission and shape of each long-range beam. The short-range beam information 312 may include information related to the direction of emission and shape of each short-range beam. Weight information 313 is further pre-stored on the storage medium 310. The weight information 313 is determined based on how the first reflected light and the second reflected light are distributed on the photodetection surface of the image sensor 200.

The signal processing circuit 400 acquires photodetection data that is output from the image sensor 200 for each exposure period, and the weight information 313 stored on the storage medium 310. The signal processing circuit 400 calculates or estimates the distance to an object for each pixel based on the photodetection data and the weight information 313 to thereby generate range data. The generated range data is stored into the storage device 500. The range data may be displayed on the display 600. The range data may be, for example, data representing a range image.

1-1-1. Configuration of Control Circuit 300

Reference is now made to a more specific exemplary configuration of the control circuit 300. The control circuit 300 includes the processor 320, and the storage medium 310. The processor 320 includes a projection/exposure timing determiner 322, a timing unit 324, a projection-control-signal output unit 326, and an exposure-control-signal output unit 328. The storage medium 310 stores the long-range beam information 311, the short-range beam information 312, the weight information 313, and the computer program 314 executed by the processor 320.

The range-information acquiring apparatus performs ranging based on an indirect time-of-flight (ToF) method. The range-information acquiring apparatus uses the technique of compressed sensing in performing ranging. Using the technique of compressed sensing makes it possible to estimate the distance to an object for each pixel even if short-range beams and long-range beams are both spatially sparse. In other words, the number of short-range beams, and the number of long-range beams may be each less than the number of beams required to cover the entire scene to be ranged.

Figure 4A:
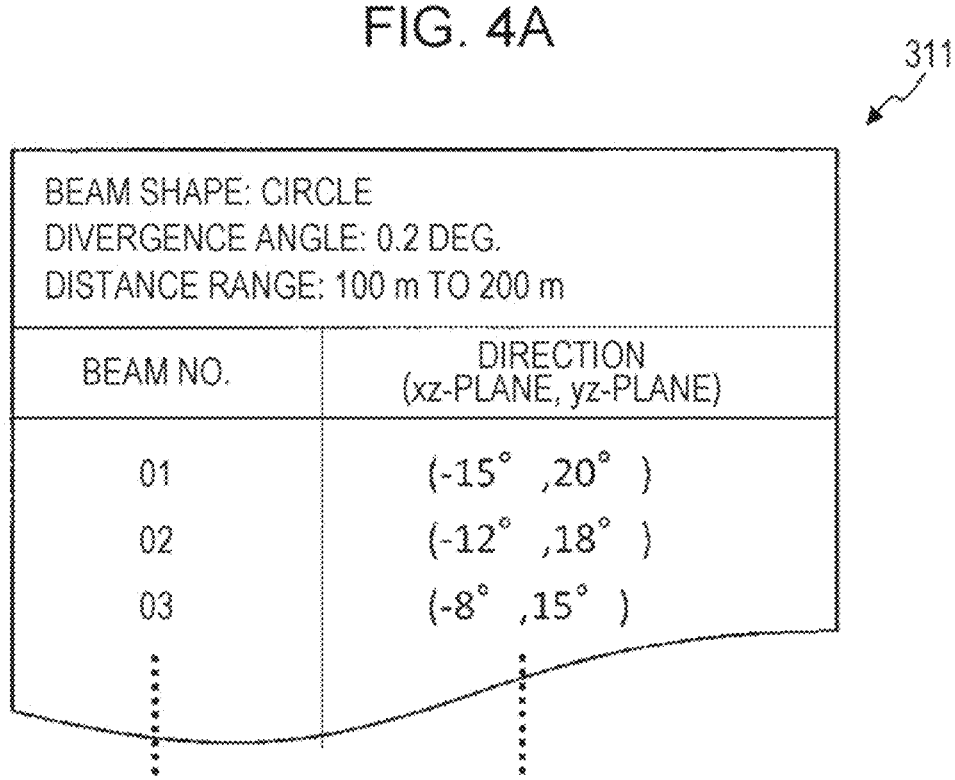
FIG. 4A illustrates exemplary long-range beam information.
Figure 4B:
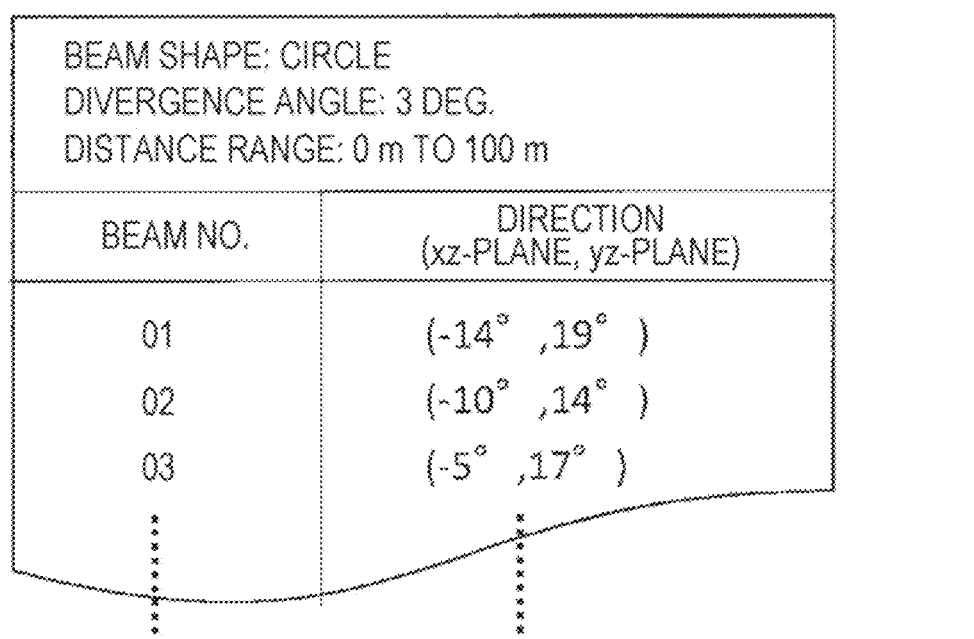
FIG. 4B illustrates exemplary short-range beam information.

FIG. 4A illustrates an example of the long-range beam information 311. FIG. 4B illustrates an example of the short-range beam information 312. In the present example, each of the long-range beam information 311 and the short-range beam information 312 includes the following pieces of information common to each light beam: beam shape, beam divergence angle, and distance range. The distance range refers to the range of distances measured by use of the beam. Each of the long-range beam information 311 and the short-range beam information 312 further includes, for each light beam, information representing beam No. and direction of emission. In the example illustrated in each of FIGS. 4A and 4B, mutually orthogonal x- and y-axes are set in parallel to the photodetection surface of the image sensor 200, and a z-axis is set in a direction perpendicular to the photodetection surface of the image sensor 200 and toward a scene. The direction of emission of each light beam is specified by its angle from the z-axis when projected on the xz-plane, and by its angle from the z-axis when projected on the yz-plane.

In the example illustrated in each of FIGS. 4A and 4B, the directions of the short-range beams and the directions of the long-range beams are determined randomly. Further, the number of short-range beams and the number of long-range beams are both less than the number of light beams required to cover the entire scene to be ranged.

The long-range beam information 311 and the short-range beam information 312 in FIGS. 4A and 4B are illustrative only and may include information other than those mentioned above. In the example illustrated in each of FIGS. 4A and 4B, the direction of projection of a beam is described by its angle when projected on the xz-plane and its angle when projected on the yz-plane. Alternatively, however, the direction of projection may be described by other methods.

Figure 5:
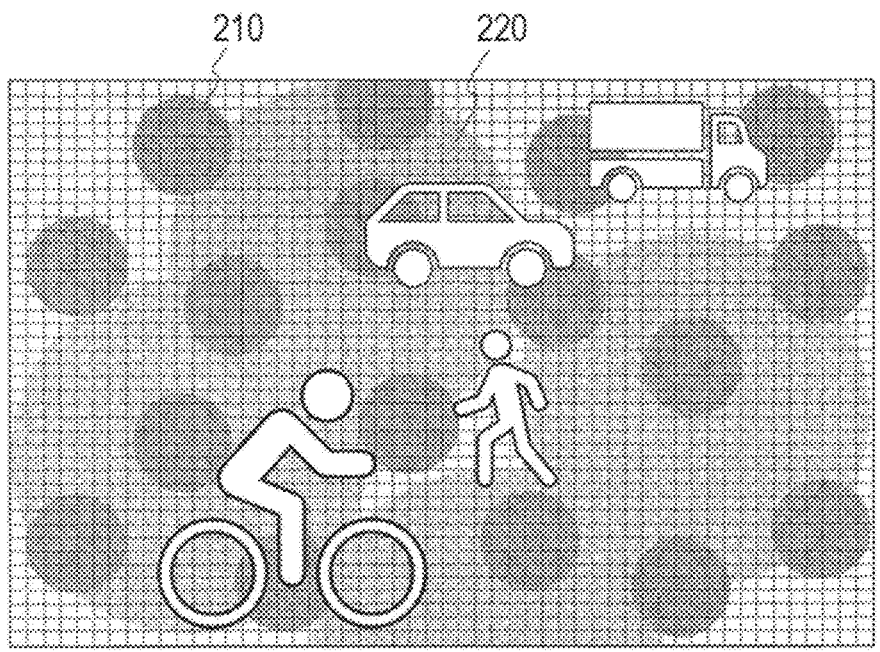
FIG. 5 schematically illustrates projection of plural long-range beams and plural short-range beams.

FIG. 5 schematically illustrates projection of the long-range beams 210 and the short-range beams 220 in accordance with Embodiment 1. In the example illustrated in FIG. 5, a bicycle is located closest to the light source 100, followed by a human being, a passenger car, and a truck in decreasing order of proximity to the light source 100. Small circles each represent a region to which the long-range beam 210 is projected, and large circles each represent a region to which the short-range beam 220 is projected. Cells drawn in FIG. 5 represent the pixels of the image sensor 200. Although in actuality the pixels of the image sensor 200 are very fine, for ease of viewing, these pixels are depicted in FIG. 5 to be coarser than their actual size. In the present case, the short-range beams 220 have a radiant intensity lower than the radiant intensity of the long-range beams 210.

In the example illustrated in FIG. 5, the long-range beams 210 and the short-range beams 220 are each projected in random directions. Regions to which these beams are projected do not cover all pixels on the image sensor 200. The directions of beam projection include the following directions: a direction in which neither the long-range beam 210 nor the short-range beam 220 is radiated; a direction in which only the long-range beam 210 is radiated; a direction in which only the short-range beam 220 is radiated; and a direction in which both the long-range beam 210 and the short-range beam 220 are radiated. The photodetection surface of the image sensor 200 that receives reflected light also has four kinds of pixel regions corresponding one-to-one to the four kinds of directions mentioned above.

The distance between the light source 100 and the image sensor 200 can be on the order of, for example, several millimeters. By contrast, distances measured by ranging are in the range of, for example, about 0 m to 200 m, and in many cases greater than or equal to several meters. With the above in mind, the light source 100 and the image sensor 200 can be regarded as being located at the same point in space coordinates. Accordingly, a light beam emitted from the light source 100 is reflected by an object existing in the direction in which the light beam is emitted, and its reflection is received by the image sensor 200 located at substantially the same position as the light source 100. If an object at a long distance and an object at a short distance exist in the direction in which the light beam is emitted, the light beam is reflected by the object at a short distance and does not reach the object at a long distance.

In Embodiment 1, the period of time in which the long-range beam 210 is reflected by an object located at a first distance range, which is relatively long, and then arrives at the image sensor 200, and the period of time in which the short-range beam 220 is reflected by an object located at a second distance range, which is relatively short, and then arrives at the image sensor 200 overlap each other at least partially. The timing of emission of each light beam and the timing of exposure are adjusted to satisfy the above-mentioned condition. The first distance range may be set to, for example, 100 m to 200 m, and the second distance range may be set to, for example, 0 m to 100 m. The long-range beam 210 reflected by an object located at a distance outside the first distance range, and the short-range beam 220 reflected by an object located at a distance outside the second distance range are not detected by the image sensor 200. In other words, even if an object exists in the direction of radiation of each of the long-range beam 210 and the short-range beam 220, only one of the two beams is detected by the image sensor 200.

If the pixel pitch is sufficiently small, and there is no pixel that is divided by the contour of an object into parts lying inside and outside the object, the photodetection surface of the image sensor 200 has no pixel that receives both the long-range beam 210 and the short-range beam 220. In this case, there may exist only the following three kinds of pixels: pixels that receive neither the long-range beam 210 nor the short-range beam 220; pixels that receive only the long-range beam 210; and pixels that receive only the short-range beam 220. If, however, there is any pixel that is divided by the contour of an object into parts lying inside and outside the object, such a pixel may receive both the long-range beam 210 and the short-range beam 220. In that case, there may exist the following four kinds of pixels: pixels that receive neither the first light beam nor the second light beam; pixels that receive only the first light beam; pixels that receive only the second light beam; and pixels that receive both the first light beam and the second light beam.

The projection/exposure timing determiner 322 illustrated in FIG. 3 determines the following timings: the timing when the long-range beams 210 are emitted by the light source 100; the timing when the short-range beams 220 are emitted by the light source 100; and the timing when exposure of the image sensor 200 is performed.

The timing unit 324 measures time.

The projection-control-signal output unit 326 outputs a projection control signal that controls the light source 100. The projection control signal includes a first control signal for projecting long-range beams, and a second control signal for projecting short-range beams. The first control signal is generated based on the long-range beam information 311, which specifies the direction, shape, and intensity of each long-range beam. The second control signal is generated based on the short-range beam information 312, which specifies the direction, shape, and intensity of each short-range beam.

The exposure-control-signal output unit 328 outputs an exposure control signal that controls exposure of the image sensor 200. Exposure of the image sensor 200 is performed in accordance with the output exposure control signal.

The respective functions of the projection/exposure timing determiner 322, the timing unit 324, the projection-control-signal output unit 326, and the exposure-controlsignal output unit 328 may be implemented by, for example, execution of the program 314 by the processor 320. In this case, the processor 320 functions as the projection/exposure timing determiner 322, the timing unit 324, the projection-control-signal output unit 326, and the exposure-control-signal output unit 328. Alternatively, these functional units may be implemented by dedicated hardware.

Reference is now made to an exemplary ranging method based on the general indirect ToF method. The ToF method measures the distance from the range-information acquiring apparatus to an object by measuring the time of flight, which is the time it takes for light emitted from a light source to be reflected by an object and return to a photodetector located near the light source. A method that directly measures the time of flight is referred to as direct ToF. A method that provides plural exposure periods, and calculates the time of flight from the energy distribution of reflected light for each exposure period is referred to as indirect ToF.

Figure 6A:
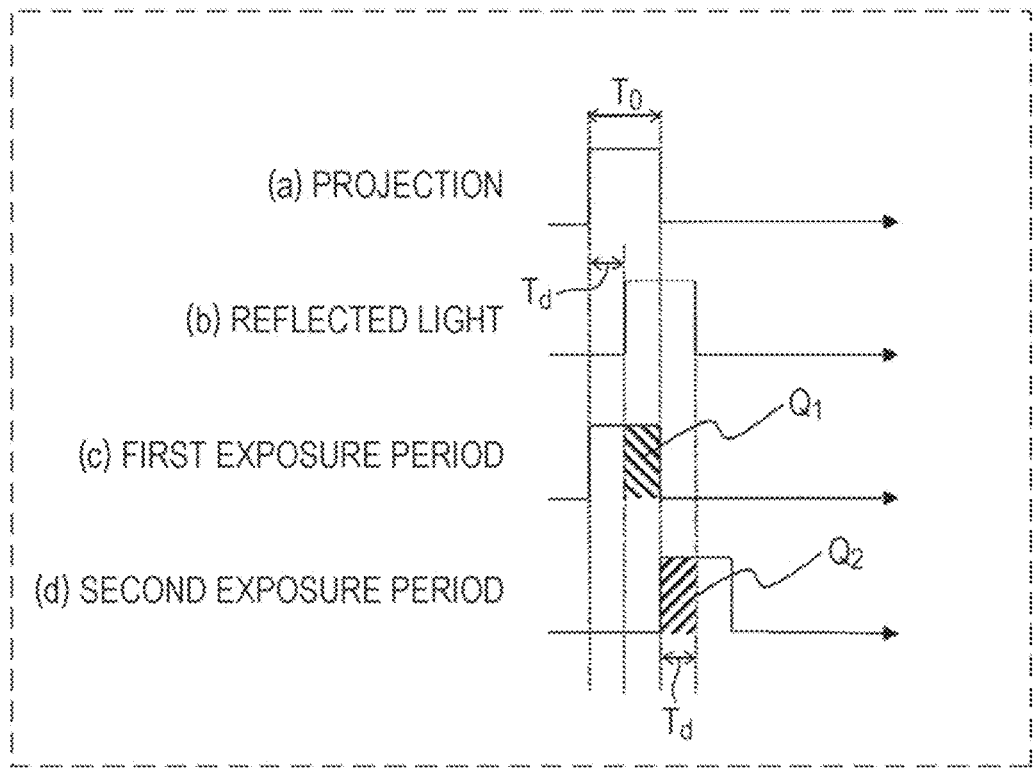
FIG. 6A illustrates an example of the timings of projection and exposure based on an indirect ToF method.

FIG. 6A illustrates an example of the timing of projection, the timing of arrival of reflected light, and two timings of exposure in accordance with the indirect ToF method. The horizontal axis represents time. The rectangular parts represent the period of projection, the period of arrival of reflected light, and the respective periods of two exposures. FIG. 6A(a) illustrates the timing when light is emitted from the light source. $T_0$ denotes the pulse width of a light beam used for ranging. FIG. 6A(b) illustrates the period of time in which the light beam emitted from the light source and reflected by an object returns to the image sensor. $T_d$ denotes the time of flight of the light beam. In the example illustrated in FIG. 6A, the reflected light returns to the image sensor in an amount of time $T_d$ shorter than the duration $T_0$ of the light pulse. FIG. 6A(c) illustrates a first exposure period of the image sensor. In this example, exposure starts simultaneously with the start of projection, and exposure ends simultaneously with the end of projection. In the first exposure period, a portion of reflected light that has returned early is subjected to photoelectric conversion, and the resulting electric charge is accumulated. $Q_1$ denotes the energy of light that has undergone photoelectric conversion during the first exposure period. The energy $Q_1$ is proportional to the amount of charge accumulated during the first exposure period.

FIG. 6A(d) illustrates a second exposure period for the image sensor. In this example, the second exposure period starts with the end of projection, and ends with the elapse of time equal to the pulse width $T_0$ of the light beam, that is, with the elapse of time equal to the first exposure period. $Q_2$ denotes the energy of light that has undergone photoelectric conversion during the second exposure period. The energy $Q_2$ is proportional to the amount of charge accumulated during the second exposure period. In the second exposure period, a portion of reflected light that has arrived at the image sensor after the end of the first exposure period is received. Since the length of the first exposure period is equal to the pulse width $T_0$ of the light beam, the duration of the reflected light received in the second exposure period is equal to the time of flight $T_d$.

In the following description, $C_{fd1}$ denotes the integral capacitance of the charge accumulated in each pixel during the first exposure period, $C_{fd2}$ denotes the integral capacitance of the charge accumulated in each pixel during the second exposure period, $I_{ph}$ denotes photocurrent, and N denotes charge transfer clock count. The output voltage of each pixel in the first exposure period is represented by $V_{out1}$ below:

$$V_{out1} = Q_1/C_{fd1} = N \times I_{ph} \times (T_0 - T_d)/C_{fd1}.$$

The output voltage of each pixel in the second exposure period is represented by $V_{out2}$ below:

$$V_{out2} = Q_2/C_{fd2} = N \times I_{ph} \times T_d/C_{fd2}.$$

In the example illustrated in FIG. 6A, the duration of the first exposure period and the duration of the second exposure period are equal, and hence $C_{fd1} = C_{fd2}$. Accordingly, $T_d$ can be represented as follows:

$$T_d = \{V_{out2}/(V_{out1} + V_{out2})\} \times T_0.$$

If the velocity of light is C ($\cong 3 \times 10^8$ m/s), the distance L between the range-information acquiring apparatus and the object is represented as follows:

$$L = \tfrac{1}{2} \times C \times T_d = \tfrac{1}{2} \times C \times \{V_{out2}/(V_{out1} + V_{out2})\} \times T_0.$$

Figure 6B:
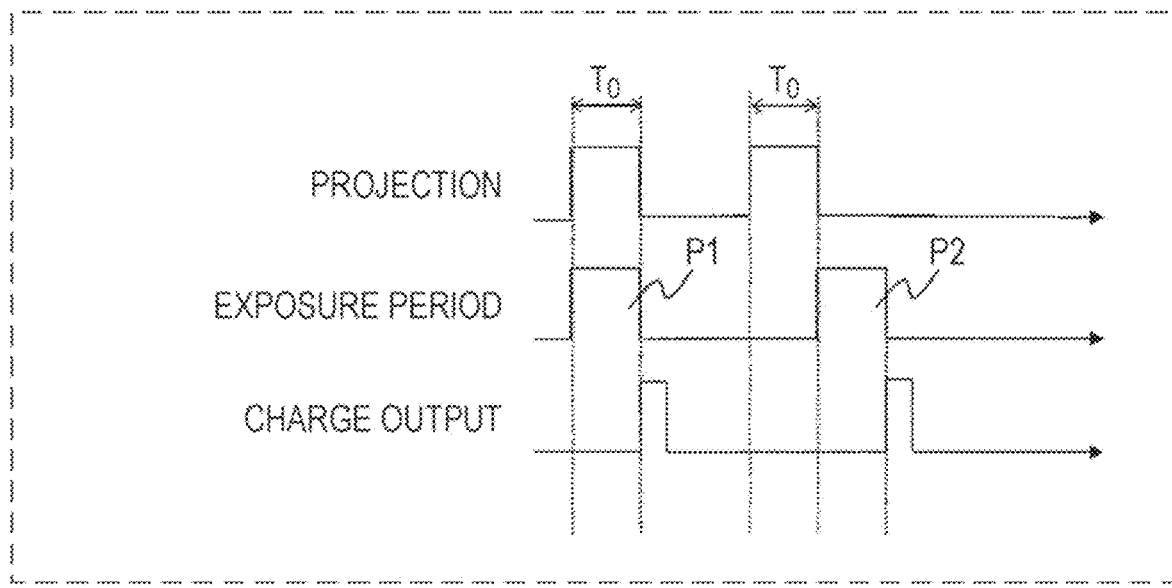
FIG. 6B illustrates another example of the timings of projection and exposure based on an indirect ToF method.

In actuality, the image sensor 200 outputs charge accumulated in each exposure period, and thus may, in some cases, be unable to perform two exposures in succession. FIG. 6B schematically illustrates the respective timings of projection, exposure, and charge output for a case where it is not possible to provide two exposure periods in succession. FIG. 6B depicts an exemplary case where, first, simultaneously with the light source 100 starting projection of light, the image sensor 200 starts exposure, and simultaneously with the light source 100 ending the projection of light, the image sensor 200 ends the exposure. This exposure period, P1, corresponds to the first exposure period illustrated in FIG. 6A. The image sensor 200 outputs, immediately after the exposure, the charge accumulated in the exposure period P1. The light source 100 then starts projection of light again, and ends the projection with the elapse of the same amount of time $T_0$ as that of the first projection. The image sensor 200 starts exposure simultaneously with the light source 100 ending the projection of light, and ends the exposure with the elapse of the same duration of time as that of the first exposure period P1. This exposure period, P2, corresponds to the second exposure period illustrated in FIG. 6A. The image sensor 200 outputs, immediately after the exposure, the charge accumulated in the exposure period P2.

As described above, in the example illustrated in FIG. 6B, to acquire a voltage required for the distance calculation mentioned above, the light source 100 projects light twice, and the timing of exposure of the image sensor 200 is varied for each projection of light. In this way, even if it is not possible to provide two exposure periods in succession, a voltage can be obtained for each exposure period. As described above, with the image sensor 200 that outputs charge for each exposure period, information representing charge accumulated during each of plural preset exposure periods is obtained by projecting light under the same conditions for a number of times equal to the number of preset exposure periods.

In actual ranging, the image sensor 200 may receive not only light emitted from the light source 100 and reflected by an object, but also background light, that is, light from an external source such as sunlight or ambient illumination. Accordingly, it is common to provide an exposure period for measuring charge accumulated due to background light that is incident on the image sensor 200 with no light beam being emitted from the image sensor 200. By subtracting the amount of charge measured during the exposure period provided for background light, from the amount of charge measured at the time when the reflection of a light beam is received, the amount of charge due to the received reflection of the light beam alone can be obtained. In Embodiment 1, for simplicity, reference is not made to an operation for background light.

The range-information acquiring apparatus according to Embodiment 1 uses ranging based on the indirect ToF method mentioned above in combination with compressed sensing to acquire range information for each pixel. The weight information 313 illustrated in FIG. 3 is used for compressed sensing. Detailed reference is now made to the weight information 313.

The weight information 313 according to Embodiment 1 represents a weight matrix based on the projection pattern of short-range beams and the projection pattern of long-range beams. The weight matrix has a number of rows equal to twice the pixel count L of the image sensor 200, and a number of columns equal to the pixel count L multiplied by the number of distance analyses N. The number of distance analyses N is the number of divisions of a distance measurement range, which represents the resolution of ranging.

Let $x_i$ be the distance vector of a pixel i (i=1, 2, ..., L) of the image sensor 200. The distance vector $x_i$ is a vector with a number of elements N, and represents the distance range of an object located at the pixel i. For example, $x_i=[1, 0, 0, 0, \ldots, 0]^T$ represents a distance range of less than 16.7 meters, $x_i=[0, 1, 0, 0, \ldots, 0]^T$ represents a distance range of greater than or equal to 16.7 meters and less than 33.3 meters, and $x_i=[0, 0, 0, 0, \ldots, 1]^T$ represents a distance range of greater than or equal to (N−1)×16.7 meters and less than N×16.7 meters. For simplicity, the following describes an exemplary case where N=12. It is assumed in this case that short-range beams are used to detect an object located in the range of 0 meters to 100 meters, and long-range beams are used to detect an object located in the range of 100 meters to 200 meters.

In the present example, as will be described later with reference to FIG. 16, long-range beams are projected first, and then short-range beams are projected. The first exposure period starts after the projection of short-range beams ends. When the first exposure period ends, the second exposure period starts.

For a pixel i, let $y_{1i}$ be a voltage corresponding to the amount of charge accumulated in the first exposure period, and $y_{2i}$ be a voltage corresponding to the amount of charge accumulated in the second exposure period. It is to be noted that these voltages are normalized to satisfy Formula 1 below.

$$(y_{1i})^2 + (y_{2i})^2 = 1 \quad (1)$$

For a pixel irradiated with only a short-range beam, $y_{1i}$ and $y_{2i}$ are represented as, for example, Formula 2 below.

$$\begin{pmatrix} y_{1i} \\ y_{2i} \end{pmatrix} = \begin{pmatrix} a1 & a2 & a3 & a4 & a5 & a6 & 0 & 0 & 0 & 0 & 0 & 0 \\ b1 & b2 & b3 & b4 & b5 & b6 & 0 & 0 & 0 & 0 & 0 & 0 \end{pmatrix} x_i \quad (2)$$

In Formula 2, a1 to a6, and b1 to b6 are real numbers that are greater than or equal to 0 and less than or equal to 1, and satisfy Formula 1. In the present example, the reflected light of a short-range beam reflected from an object located at a distance of greater than 100 meters from the range-information acquiring apparatus is not detected due to the attenuation of its intensity. Thus, the values in the seventh to twelfth columns of the matrix in Formula 2 are set to 0.

For a pixel irradiated with only a long-range beam, $y_{1i}$ and $y_{2i}$ are represented as for example, Formula 3 below.

$$\begin{pmatrix} y_{1i} \\ y_{2i} \end{pmatrix} = \begin{pmatrix} 0 & 0 & 0 & 0 & 0 & 0 & a7 & a8 & a9 & a10 & a11 & a12 \\ 0 & 0 & 0 & 0 & 0 & 0 & b7 & b8 & b9 & b10 & b11 & b12 \end{pmatrix} x_i \quad (3)$$

In Formula 3, a7 to a12, and b7 to b12 are real numbers that are greater than or equal to 0 and less than or equal to 1, and satisfy Formula 1. In the present example, each exposure period is set such that the reflected light of a long-range beam reflected from an object located at a distance of less than 100 meters from the range-information acquiring apparatus is not detected. Thus, the values in the first to sixth columns of the matrix in Formula 3 are set to 0.

For a pixel simultaneously irradiated with a short-range beam and a long range beam, $y_{1i}$ and $y_{2i}$ are represented as, for example, Formula 4 below.

$$\begin{pmatrix} y_{1i} \\ y_{2i} \end{pmatrix} = \begin{pmatrix} a1 & a2 & a3 & a4 & a5 & a6 & a7 & a8 & a9 & a10 & a11 & a12 \\ b1 & b2 & b3 & b4 & b5 & b6 & b7 & b8 & b9 & b10 & b11 & b12 \end{pmatrix} x_i \quad (4)$$

For a pixel irradiated with neither of these beams, $y_{1i}$ and $y_{2i}$ are zero, and thus represented by Formula 5 below.

$$\begin{pmatrix} y_{1i} \\ y_{2i} \end{pmatrix} = \begin{pmatrix} 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \end{pmatrix} x_i \quad (5)$$

The numeral values of individual elements of the matrices in Formula 2 to Formula 5 are dependent on the forms of $x_i$, $y_{1i}$, and $y_{2i}$. The numeral values of individual elements of the above-mentioned matrices vary with the actual implementation.

A combination of Formula 2 to Formula 5 can be represented by Formula 6 as follows:

$$Y = WX \quad (6),$$

where, with the pixel count being L, Y is represented by Formula 7 below, and X is represented by Formula 8 below.

$$Y = [y_{11}, y_{21}, y_{12}, y_{22}, \ldots, y_{1L}, y_{2L})]^T \quad (7)$$

$$X = [x_1^T, x_2^T, \ldots, x_L^T]^T \quad (8)$$

Y is a vector in which normalized amounts of charge or normalized voltage values detected in each of the first exposure period and the second exposure period are arranged. X is a vector in which L above-mentioned vectors $x_i$ each having the number of elements N are arranged, and the vector X has a number of elements equal to L×N. The vector X represents the distance for each individual pixel. More specifically, the vector X indicates in what number distance range an object located at a position corresponding to each pixel is, among plural distance ranges obtained by dividing a distance measurement range by the number of analyses N. For each individual pixel, distance is expressed by a value of 0 or 1 given to the element representing each of the above-mentioned distance ranges. In the case of a pixel for which the corresponding object is located at a position less than 200 meters from the range-information acquiring apparatus, $x_i$ is a vector for which only one of its N elements is 1 and the other elements are 0. In the case of a pixel for which no corresponding object is located at a position less than 200 meters from the range-information acquiring apparatus, $x_i$ is a vector whose N elements are all 0.

W is a matrix with a number of rows 2L and a number of columns L×N. According to the definitions of $[y_{1i}, y_{2i}]$ and $x_i$ mentioned above, the matrix W is represented by Formula 9 below.

$$W = \begin{vmatrix} w & 0 & \ldots & 0 & 0 \\ 0 & w & \ldots & 0 & 0 \\ \vdots & \vdots & \ddots & \vdots & \vdots \\ 0 & 0 & \ldots & \ddots & 0 \\ 0 & 0 & \ldots & 0 & w \end{vmatrix} \tag{9}$$

Each element w of the matrix W in Formula 9 represents one of the matrices in Formulae 2 to 5. Which one of the matrices in Formulae 2 to 5 each element w corresponds to may be determined by, for example, performing calibration in advance. In Embodiment 1, the weight matrix W represented in Formula 9 is used as the weight information 313.

1-1-2. Configuration of Light Source 100

An exemplary configuration of the light source 100 is now described. The light source 100 may be, for example, a light source as disclosed in U.S. Patent Application Publication No. 2013/0088726 that emits light in any given spatial pattern by use of a coded mask. Alternatively, the light source 100 may include, for example, an optical phased array as disclosed in Japanese Unexamined Patent Application Publication (Translation of PCT Application) No. 2016-508235 that is capable of emitting light in any given spatial pattern. Further, the light-emitting device disclosed in U.S. Patent Application Publication No. 2018/224709 may be used for the light source 100. An exemplary configuration of the light source 100 is described below.

Figure 7:
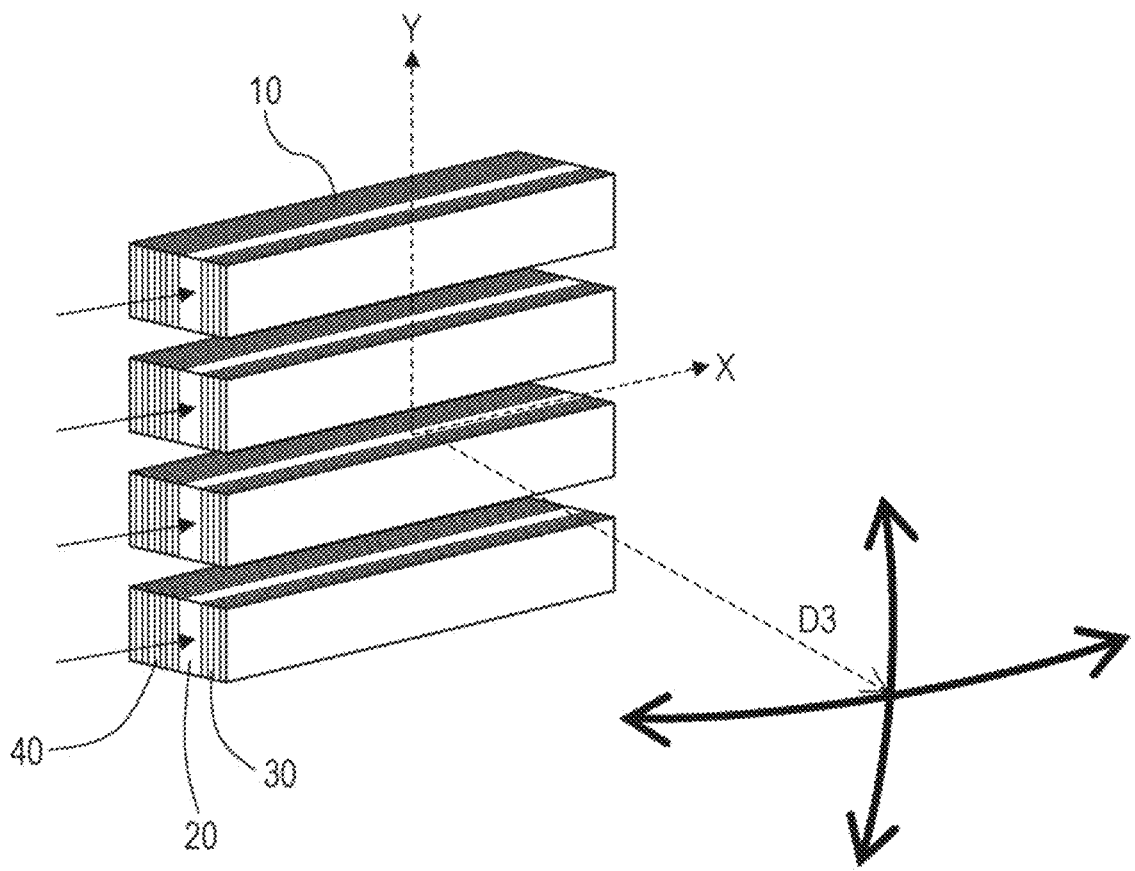
FIG. 7 is a schematic perspective view of an exemplary light-emitting device.

FIG. 7 is a schematic perspective view of an exemplary light-emitting device that may be used for the light source 100. The light source 100 may include a combination of plural light-emitting devices that each emit light in a different direction. FIG. 7 is a simplified illustration of the configuration of one of these light-emitting devices.

The light-emitting device includes an optical waveguide array with plural optical waveguide elements 10. The optical waveguide elements 10 each extend in a first direction (X-direction in FIG. 7). The optical waveguide elements 10 are arranged regularly in a second direction (Y-direction in FIG. 7) transverse to the first direction. The optical waveguide elements 10 allow light to propagate in the first direction while causing light to be emitted in a third direction D3, which is transverse to an imaginary plane parallel to the first and second directions.

The optical waveguide elements 10 each include a first mirror 30 and a second mirror 40 that face each other, and an optical waveguide layer 20 located between the mirror 30 and the mirror 40. Each of the mirror 30 and the mirror 40 has, at its interface with the optical waveguide layer 20, a reflecting surface transverse to the third direction D3. The mirror 30 and the mirror 40, and the optical waveguide layer 20 extend in the first direction.

The reflecting surface of the first mirror 30, and the reflecting surface of the second the mirror 40 face each other substantially in parallel. Of the two mirrors 30 and 40, at least the first mirror 30 has a characteristic that allows the first mirror 30 to transmit a portion of light propagating in the optical waveguide layer 20. In other words, the first mirror 30 has a higher light transmittance than the second mirror 40 with respect to the above-mentioned light. As a result, a portion of the light propagating in the optical waveguide layer 20 is emitted to the outside through the first mirror 30. Each of the mirrors 30 and 40 may be, for example, a multilayer mirror formed by a dielectric multilayer coating (also sometimes referred to as "multilayer reflective coating").

By adjusting the phase of light input to each optical waveguide element 10, and by further adjusting the refractive index or thickness of the optical waveguide layer 20 of each optical waveguide element 10, or the wavelength of light input to the optical waveguide layer 20, light can be emitted in any given direction.

Figure 8:
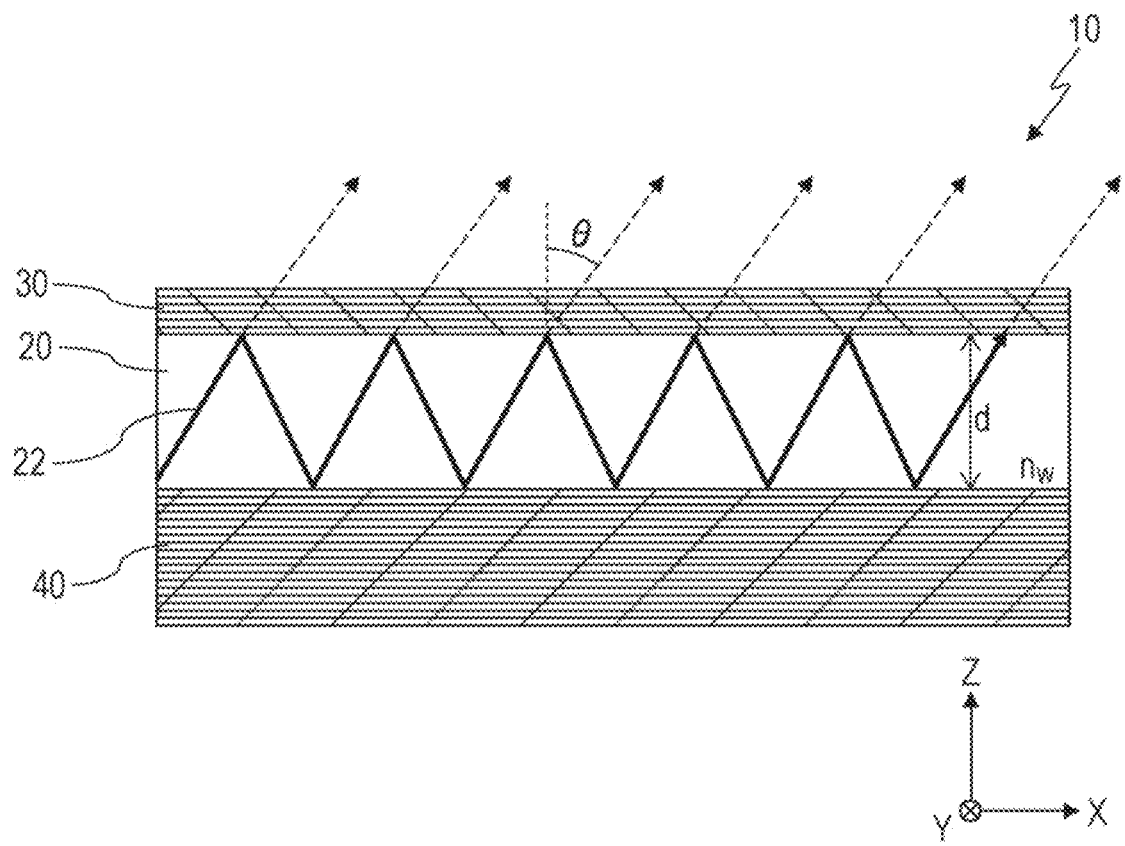
FIG. 8 schematically illustrates an exemplary cross-sectional structure of an optical waveguide element and exemplary light propagating in the optical waveguide element.

FIG. 8 schematically illustrates an exemplary cross-sectional structure of one optical waveguide element 10, and exemplary light propagating in the optical waveguide element 10. FIG. 8 schematically illustrates, with a direction perpendicular to the X- and Y-directions in FIG. 7 being defined as a Z-direction, a cross-section of the optical waveguide element 10 parallel to the XZ-plane of the optical waveguide element 10. The optical waveguide element 10 includes a pair of mirrors 30 and 40 disposed so as to sandwich the optical waveguide layer 20. Light 22 introduced from one end of the optical waveguide layer 20 in the X-direction propagates in the optical waveguide layer 20 while being repeatedly reflected by the first mirror 30 disposed on the upper surface of the optical waveguide layer 20 and by the second mirror 40 disposed on the lower surface of the optical waveguide layer 20. The first the mirror 30 has alight transmittance higher than the light transmittance of the second the mirror 40. This allows a portion of light to be output from the first mirror 30.

In a typical optical waveguide such as an optical fiber, light propagates along the optical waveguide while repeating total internal reflections. By contrast, in the optical waveguide element 10 according to Embodiment 1, light propagates while being reflected back and forth by the mirrors 30 and 40 disposed on the top and bottom of the optical waveguide layer 20. This means that there is no constraint on the angle of light propagation. As used herein, the term "angle of light propagation" means the angle of incidence at the interface between the mirror 30 or 40 and the optical waveguide layer 20. The optical waveguide element 10 allows propagation of light that is incident on the mirror 30 or the mirror 40 at an angle closer to the perpendicular. In other words, the optical waveguide element 10 allows propagation of light that is incident at an angle smaller than the critical angle for total internal reflection. Consequently, the group velocity of light in the direction of light propagation decreases significantly in comparison to the velocity of light in free space. The optical waveguide element 10 thus has a property such that the light propagation conditions change greatly with changes in the wavelength of light, the thickness of the optical waveguide layer 20, and the refractive index of the optical waveguide layer 20. Such an optical waveguide is referred to as "reflective optical waveguide" or "slow-light optical waveguide".

The emission angle θ at which light is emitted into air from the optical waveguide element 10 is represented by Formula 10 below.

$$\sin\theta = \sqrt{n_w^2 - \left(\frac{m\lambda}{2d}\right)^2} \tag{10}$$

As can be appreciated from Formula 10, the direction of light emission can be changed by changing one of the following values: the wavelength λ of light in air; the refractive index $n_w$ of the optical waveguide layer 20; and the thickness d of the optical waveguide layer 20.

For example, if $n_w$=2, d=387 nm, λ=1550 nm, and m=1, the emission angle is 0 degrees. If the refractive index $n_w$ is changed to 2.2 in this state, the emission angle changes to approximately 66 degrees. If the thickness d is changed to 420 nm without changing the refractive index, the emission angle changes to approximately 51 degrees. If the wavelength λ is changed to 1500 nm without changing neither the refractive index nor the thickness, the emission angle changes to approximately 30 degrees. In this way, the direction of light emission can be changed by changing one of the wavelength λ of light, the refractive index $n_w$ of the optical waveguide layer 20, and the thickness d of the optical waveguide layer 20.

The wavelength λ of light may, for example, fall within the wavelength region of 400 nm to 1100 nm (visible to near-infrared regions) for which high detection sensitivity is obtained with common image sensors that detect light through absorption of light in silicon (Si). In another example, the wavelength λ may fall within the near-infrared wavelength region of 1260 nm to 1625 nm that allows for relatively small transfer loss in optical fibers or Si optical waveguides. These wavelength ranges are intended to be illustrative only. The wavelength region of light to be used may not necessarily be the visible or infrared wavelength region but may be, for example, the ultraviolet wavelength region.

The light-emitting device may include a first adjustment element for changing at least one of the refractive index, thickness, or wavelength of the optical waveguide layer 20 in each optical waveguide element 10. This makes it possible to adjust the direction of emitted light.

The optical waveguide layer 20 may include a liquid crystal material or electro-optical material to adjust the refractive index of at least a portion of the optical waveguide layer 20. The optical waveguide layer 20 may be sandwiched by a pair of electrodes. By applying a voltage across the pair of electrodes, the refractive index of the optical waveguide layer 20 can be changed.

To adjust the thickness of the optical waveguide layer 20, for example, at least one actuator may be connected to at least one of the first mirror 30 or the second mirror 40. By using the at least one actuator to change the distance between the first mirror 30 and the second mirror 40, the thickness of the optical waveguide layer 20 can be changed. If the optical waveguide layer 20 is made of liquid, the thickness of the optical waveguide layer 20 can be easily changed.

For an optical waveguide array with the optical waveguide elements 10 arranged in one direction, the direction of light emission changes due to the interference of light emitted from each optical waveguide element 10. The direction of light emission can be changed by adjusting the phase of light supplied to each optical waveguide element 10. The principle of this operation is described below.

Figure 9A:
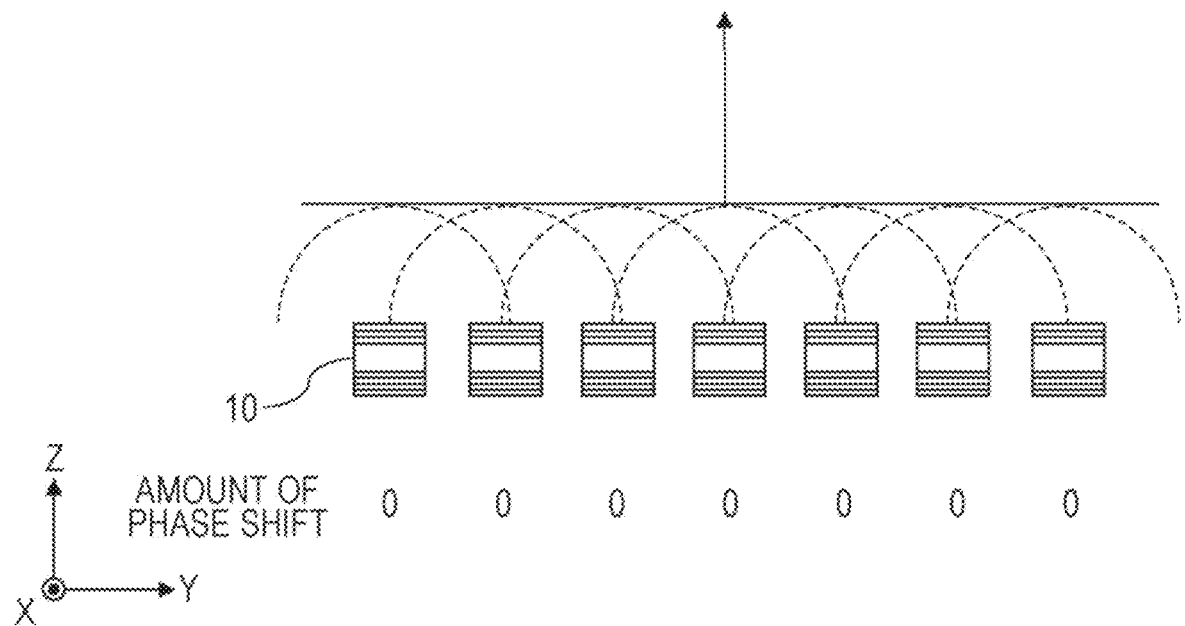
FIG. 9A schematically illustrates light being emitted in a direction perpendicular to the emitting surface of an optical waveguide array.

FIG. 9A illustrates a cross-section of an optical waveguide array that emits light in a direction perpendicular to the emitting surface of the optical waveguide array. FIG. 9A also illustrates the amount of phase shift of light propagating in each optical waveguide element 10. The amount of phase shift in this case is a value referenced to the phase of light propagating in the leftmost optical waveguide element 10. The optical waveguide array according to Embodiment 1 includes the optical waveguide elements 10 arranged at equal intervals. In FIG. 9A, the dashed arcs each represent the wavefront of light emitted from each optical waveguide element 10. The straight line represents the wavefront formed by interference of light. The arrow represents the direction of light emitted from the optical waveguide array (i.e., the direction of the wave vector). In the example illustrated in FIG. 9A, the rays of light propagating in the respective optical waveguide layers 20 of the optical waveguide elements 10 are all in phase with each other. In this case, light is emitted in a direction (Z-direction) perpendicular to both the direction in which the optical waveguide elements 10 are arranged (Y-direction) and the direction in which the optical waveguide layer 20 extends (X-direction).

Figure 9B:
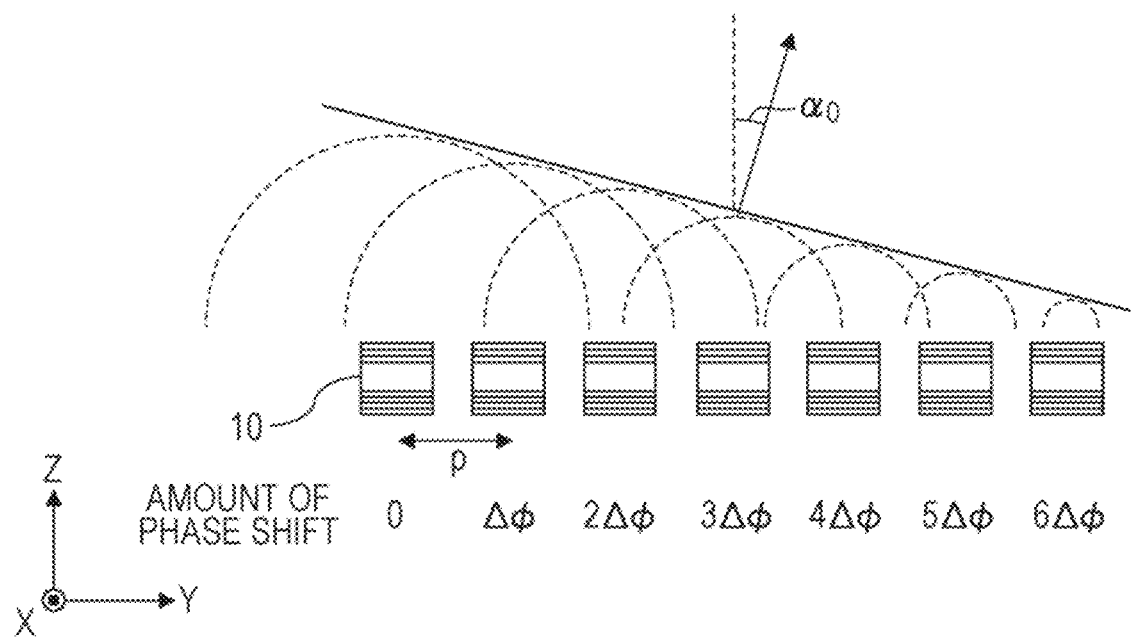
FIG. 9B schematically illustrates light being emitted in a direction different from the direction perpendicular to the emitting surface of an optical waveguide array.

FIG. 9B illustrates a cross-section of an optical waveguide array that emits light in a direction different from a direction perpendicular to the emitting surface of the optical waveguide array. In the example illustrated in FIG. 9B, light propagating in the optical waveguide layer 20 of each optical waveguide element 10 differs in phase by a fixed amount (Δφ) in the direction of arrangement of the optical waveguide elements 10. In this case, light is emitted in a direction different from the Z-direction. By changing the value of Δφ, the Y-direction component of the wave vector of light can be changed. If the distance between the centers of two adjacent optical waveguide elements 10 is p, then the emission angle $\alpha_0$ of light is represented by Formula 11 below.

$$\sin\alpha_0 = \frac{\Delta\phi\lambda}{2\pi p} \tag{11}$$

If the number of optical waveguide elements 10 is N, then the divergence angle Δα of the emission of light is represented by Formula 12 below.

$$\Delta\alpha = \frac{2\lambda}{Np\cos\alpha_0} \tag{12}$$

Therefore, the greater the number of optical waveguide elements 10, the smaller the divergence angle Δα can be made.

Figure 10:
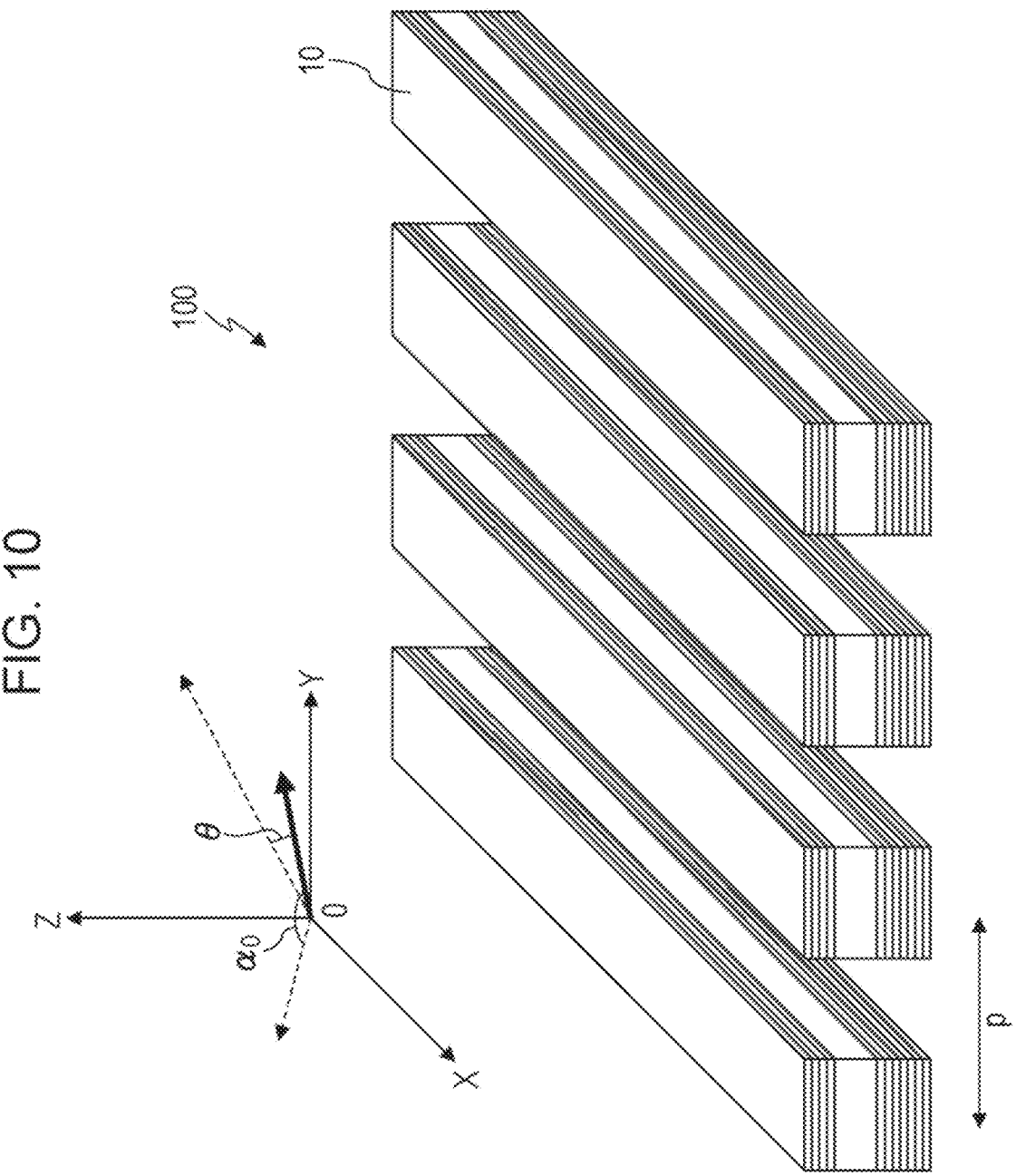
FIG. 10 is a schematic perspective view of an optical waveguide array in a three-dimensional space.

FIG. 10 is a schematic perspective view of an optical waveguide array in a three-dimensional space. The thick arrow in FIG. 10 represents the direction of light emitted from the light-emitting device. The symbol θ represents an angle formed by the direction of light emission and the YZ-plane. The angle θ satisfies Formula 10. The symbol $\alpha_0$ represents the angle formed by the direction of light emission and the XZ-plane. The angle $\alpha_0$ satisfies Formula 11.

To control the phase of light emitted from each optical waveguide element 10, for example, a phase shifter for changing the phase of light may be disposed at a location upstream of where light is introduced into the optical waveguide element 10. The light-emitting device may include plural phase shifters each connected to the corresponding one of the optical waveguide elements 10, and a second adjustment element for adjusting the phase of light propagating in each phase shifter. Each phase shifter includes an optical waveguide coupled to the optical waveguide layer 20 of the corresponding one of the optical waveguide elements 10 directly or via another optical waveguide. The second adjustment element changes the difference between the phases of light rays propagating from the phase shifters to the corresponding optical waveguide elements 10 to thereby change the direction of each of light rays emitted from the optical waveguide elements 10 (i.e., the third direction D3). In the following description, as with the optical waveguide array, an arrangement of plural phase shifters will be sometimes referred to as "phase shifter array".

Figure 11:
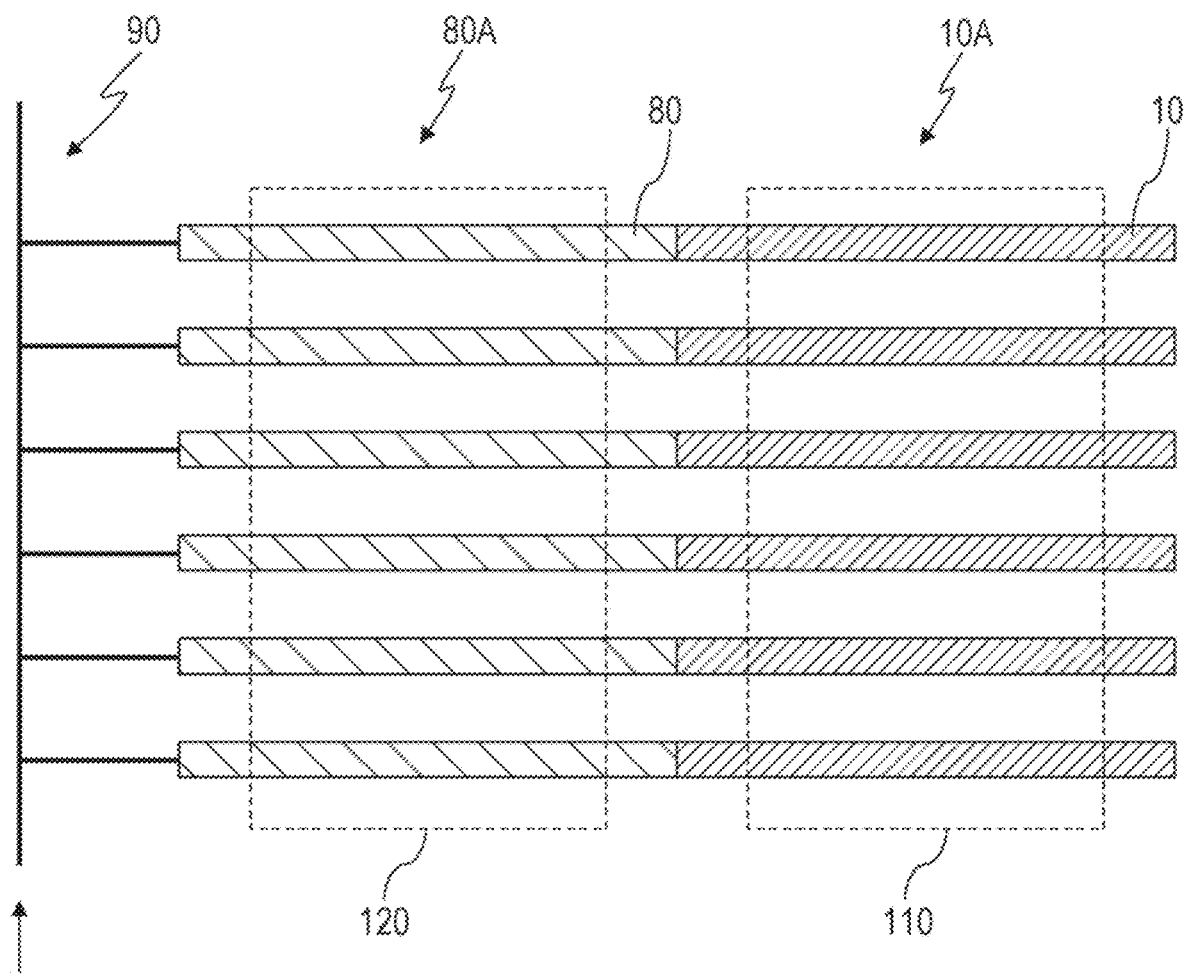
FIG. 11 illustrates an exemplary optical waveguide array and an exemplary phase shifter array.

FIG. 11 schematically illustrates an optical waveguide array 10A and a phase shifter array 80A as viewed in a direction normal to the light-emitting surface (Z-direction). In the example illustrated in FIG. 11, phase shifters 80 all have the same propagation characteristics, and the optical waveguide elements 10 all have the same propagation characteristics. Each phase shifter 80 and each optical waveguide element 10 may have the same length or may have a different length. If each phase shifter 80 has the same length, for example, the amount of phase shift of each phase shifter 80 can be adjusted by the drive voltage.

By employing a structure in which the respective lengths of the phase shifters 80 are varied in equal steps, it is possible to give phase shifts in equal steps with the same drive voltage. The light-emitting device further includes an optical divider 90 that divides light into branches each supplied to the corresponding phase shifter 80, a first driving circuit 110 that drives each optical waveguide element 10, and a second driving circuit 120 that drives each phase shifter 80. The straight arrow in FIG. 11 represents input of light. By independently controlling the first driving circuit 110 and the second driving circuit 120 that are provided separately, the direction of light emission can be varied two-dimensionally. In the present example, the first driving circuit 110 serves as one component of the first adjustment element, and the second driving circuit 120 serves as one component of the second adjustment element.

The first driving circuit 110 changes at least one of the refractive index or thickness of the optical waveguide layer 20 in each optical waveguide element 10 to thereby change the angle at which light is emitted from the optical waveguide layer 20. The second driving circuit 120 changes the refractive index of an optical waveguide 20 in each phase shifter 80 to thereby change the phase of light propagating in the optical waveguide 20. The optical divider 90 may be implemented by an optical waveguide in which light propagates through total internal reflection, or may be implemented by a reflective optical waveguide similar to the optical waveguide element 10.

The branches of light divided by the optical divider 90 may be introduced to the corresponding phase shifters 80 after having their phases controlled. This phase control may be performed by use of, for example, a passive phase control structure based on adjustment of the length of an optical waveguide up to the phase shifter 80. Alternatively, the phase control may be performed by using a phase shifter that has a function similar to the phase shifter 80 and can be controlled by an electrical signal. Through such methods, for example, the phase of light may be adjusted before the light is introduced into each phase shifter 80 such that all of the phase shifters 80 receive supply of light of equal phase. Through such an adjustment, the control of each phase shifter 80 by the second driving circuit 120 can be simplified.

Details of the operating principle and operation method of the light-emitting device mentioned above are disclosed in U.S. Patent Application Publication No. 2018/224709, the entire disclosure of which is incorporated herein by reference.

The light source 100 according to Embodiment 1 may be implemented by a combination of plural waveguide arrays that each emit light in a different direction. An exemplary configuration of such a light source 100 is described below.

Figure 12:
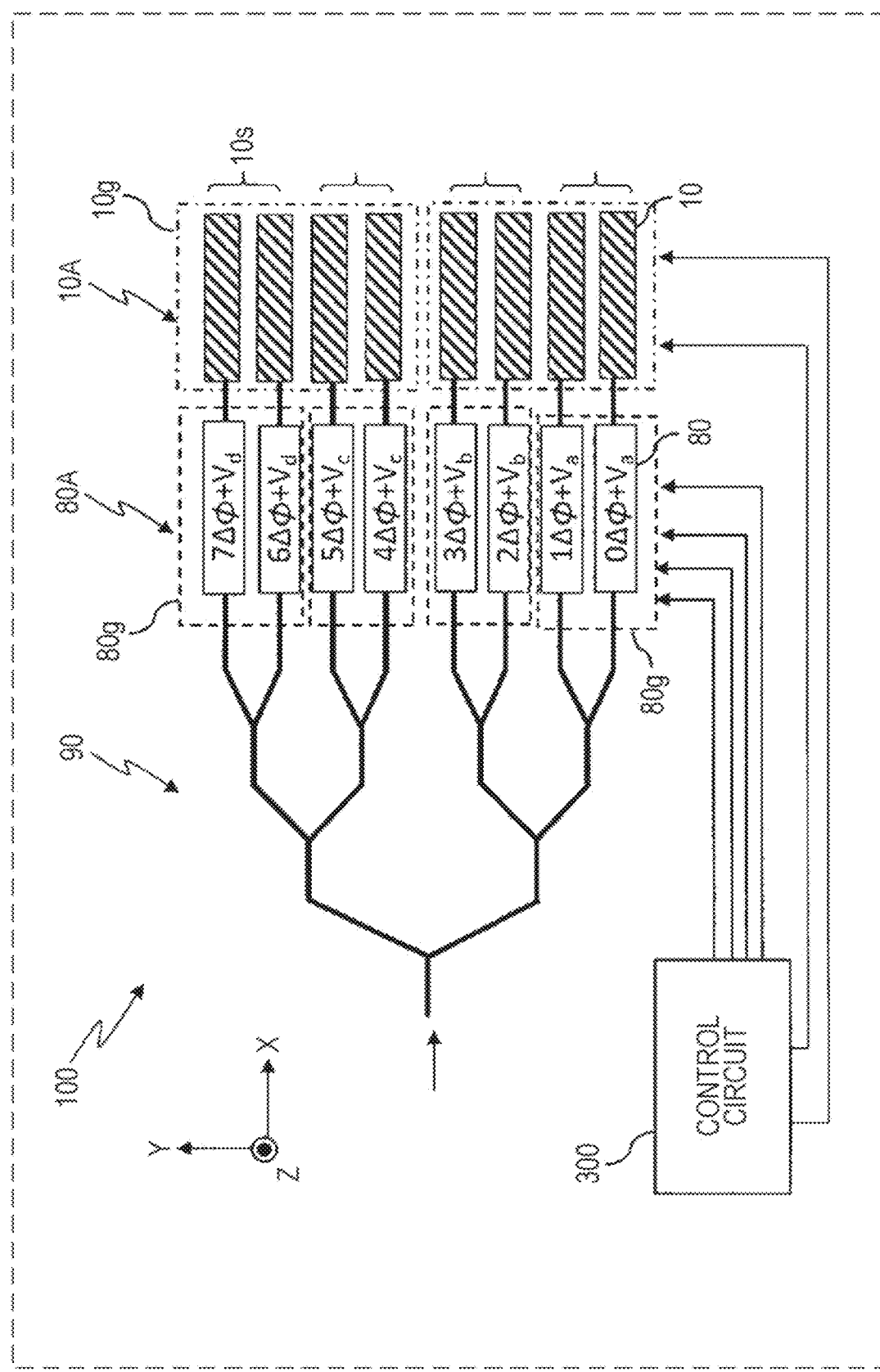
FIG. 12 illustrates an exemplary light source.

FIG. 12 illustrates an example of the light source 100. The light source 100 in this example includes the optical waveguide array 10A, and the phase shifter array 80A connected to the optical waveguide array 10A. The optical waveguide array 10A includes plural optical waveguide groups 10g arranged in the Y-direction. Each optical waveguide group 10g includes one or more optical waveguide elements 10. The phase shifter array 80A includes plural phase shifter groups 80g arranged in the Y-direction. Each phase shifter group 80g includes one or more phase shifters 80. In this example, a collection of phase shifter groups 80g differs from a collection of optical waveguide groups 10g. More specifically, two phase shifter groups 80g are connected to each one optical waveguide group 10g.

The amount of phase shift of each phase shifter 80 is individually controlled by the control circuit 300. The phase shifters 80 each provide an amount of phase shift that is controlled to be the sum of a first amount of phase shift (an integer multiple of $\Delta\varphi$) based on the order of the arrangement of the phase shifters 80, and a second amount of phase shift ($V_a$, $V_b$, $V_c$, or $V_d$) that differs for each phase shifter group 80g. By varying the second amount of phase shift for each phase shifter group 80g, the Y-component in the direction of light beam emission, and the divergence angle in the Y-direction of the spot size are controlled.

The control circuit 300 determines the value of applied voltage individually for each optical waveguide group 10g. By controlling the voltage applied to each optical waveguide group 10g, the X-component in the direction of light beam emission is controlled. The direction of light emission is determined dependent on how the phase shifter groups 80g and the optical waveguide groups 10g are combined. In the example illustrated in FIG. 12, light is emitted in the same direction from two adjacent optical waveguide groups 10s each connected to a single shifter group 80g. If the radiant flux of light emitted from a single optical waveguide group 10g is defined as a single light beam, two light beams can be emitted simultaneously in the example illustrated in FIG. 12. Increasing the number of optical waveguide elements 10 and the number of phase shifters 80 makes it possible to further increase the number of beams.

Figure 13:
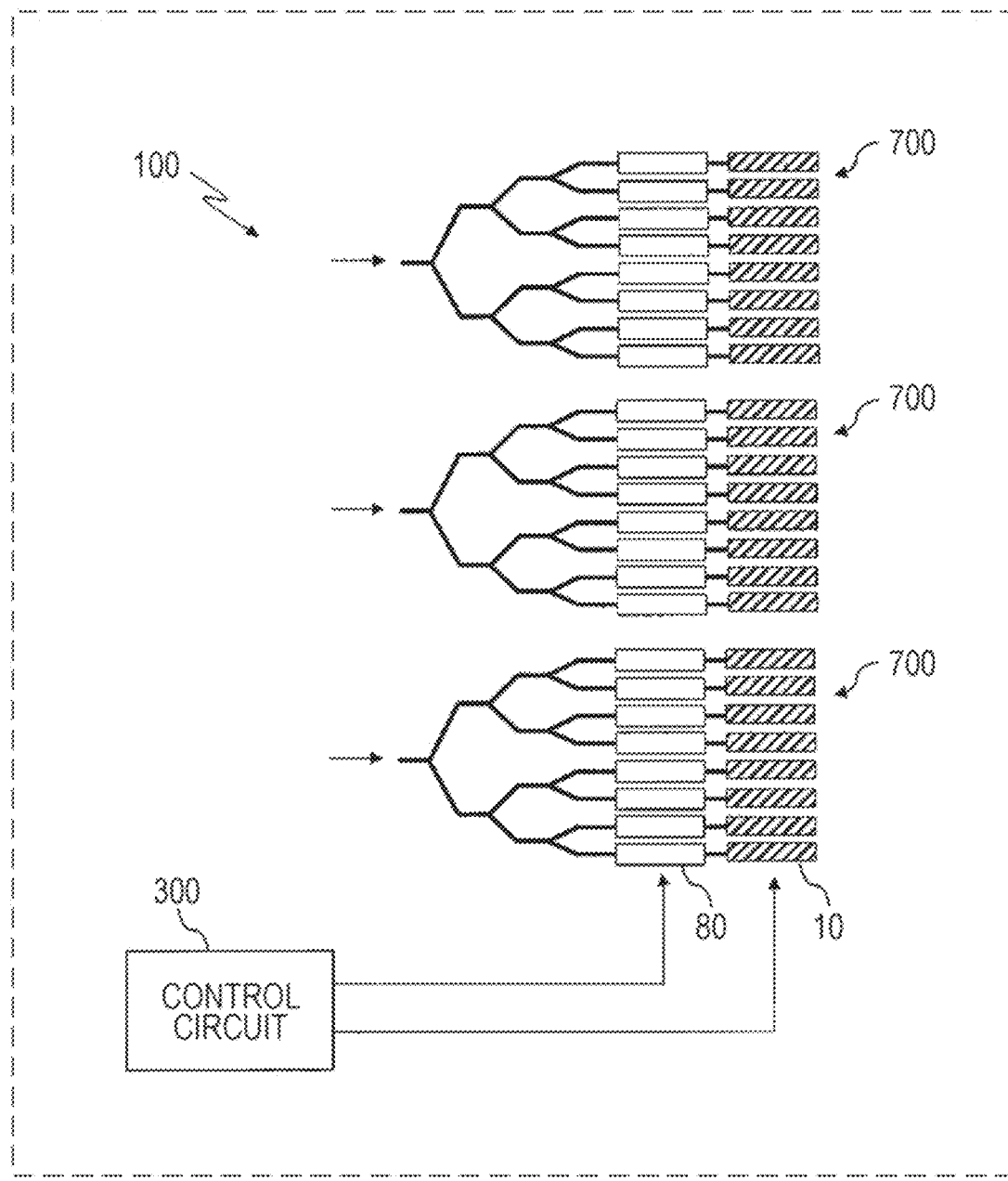
FIG. 13 illustrates another exemplary light source.

FIG. 13 illustrates another exemplary configuration of the light source 100. The light source 100 in this example includes plural light-emitting devices 700 that each emit a light beam in a different direction. In this example, plural phase shifters 80 and plural optical waveguide elements 10 are mounted on a single chip. The control circuit 300 controls the voltage applied to each phase shifter 80 and each optical waveguide element 10 in each light-emitting device 700. The control circuit 300 thus controls the direction of a light beam emitted from each light-emitting device 700. Although the light source 100 includes three light-emitting devices 700 in this example, the light source 100 may include more light-emitting devices 700. Each of a short-range beam and a long-range beam may be made up of a collection of light beams emitted from the light-emitting devices 700.

Figure 14:
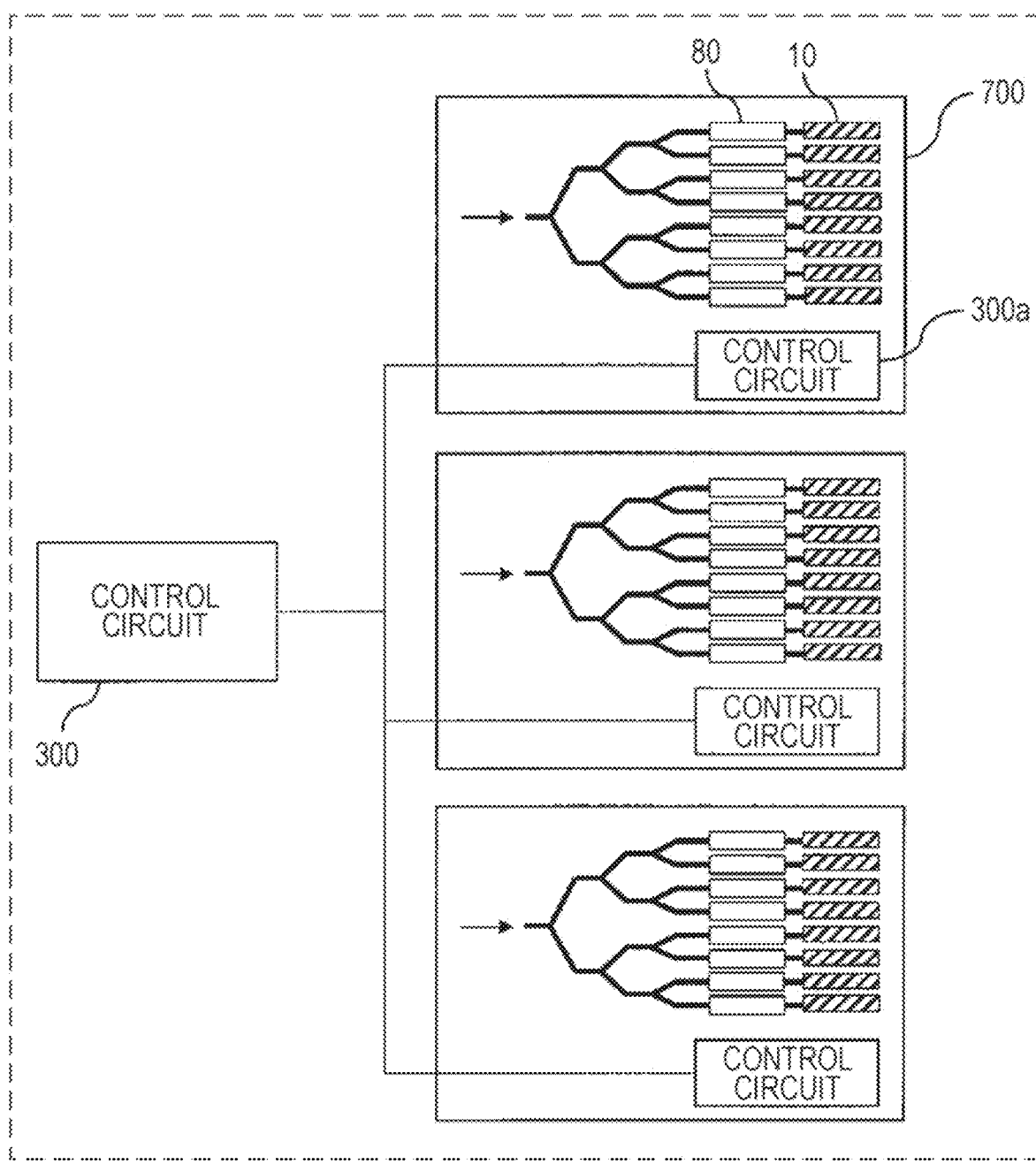
FIG. 14 illustrates still another exemplary light source.

FIG. 14 illustrates still another exemplary configuration of the light source 100. The light source 100 in this example includes plural light-emitting devices 700 each mounted on a different chip. The light-emitting devices 700 emit light beams in different directions. Each light-emitting device 700 includes a control circuit 300a that determines a voltage applied to each phase shifter 80 and each optical waveguide element 10. The control circuit 300a of each light-emitting device 700 is controlled by the control circuit 300 external to the light-emitting device 700. Although the light source 100 includes three light-emitting devices 700 in this example as well, the light source 100 may include more light-emitting devices 700. Each of a short-range beam and a long-range beam may be made up of a collection of light beams emitted from the light-emitting devices 700.

1-1-3. Configuration of Image Sensor 200

Reference is now made to the configuration of the image sensor 200 illustrated in FIG. 3.

The image sensor 200 includes plural photodetector elements arranged two-dimensionally on its photodetection surface. The image sensor 200 may be, for example, a charge-coupled device (CCD) sensor, a complementary metal oxide semiconductor (CMOS) sensor, or an infrared array sensor. Each photodetector element includes, for example, a photoelectric conversion element such as a photodiode, and one or more charge accumulators. Charge produced by photoelectric conversion is accumulated in the charge accumulator during an exposure period. The charge accumulated in the charge accumulator is output after the end of the exposure period.

In this way, each photodetector element outputs an electrical signal responsive to the amount of light received during the exposure period. This electrical signal is referred to as "photodetection data". The image sensor 200 may be a monochrome imaging element, or may be a color imaging element. For example, the image sensor 200 may be a color imaging element having an R/G/B, R/G/B/IR, or R/G/B/W filter. The image sensor 200 may have detection sensitivity not only for the visible wavelength range but also for, for example, ultraviolet, near-infrared, mid-infrared, far-infrared, or other wavelength ranges. The image sensor 200 may be a sensor using a single photon avalanche diode (SPAD). The image sensor 200 may include an electronic shutter mechanism capable of exposing signals of all pixels at once, that is, a global shutter mechanism.

Although Embodiment 1 uses the image sensor 200, a photodetector device different from the image sensor 200 may be used. For example, a photodetector device including plural one-dimensionally arranged photodetector elements may be used.

1-1-4. Configuration of Signal Processing Circuit 400

The signal processing circuit 400 may include one or more processors such as a CPU and/or a GPU to process a signal output from the image sensor 200. The signal processing circuit 400 illustrated in FIG. 3 includes a distance estimator 410, and an image generator 430. The distance estimator 410 calculates or estimates distance for each pixel based on a signal output from the image sensor 200. The image generator 430 generates a range image based on range information of each pixel. The function of the distance estimator 410 and the function of the image generator 430 may be implemented by, for example, execution of a computer program by a processor of the signal processing circuit 400. In that case, the processor functions as the distance estimator 410 and the image generator 430. Alternatively, these functional units may be implemented by dedicated hardware.

1-2. Operation of Range-Information Acquiring Apparatus

Figure 15:
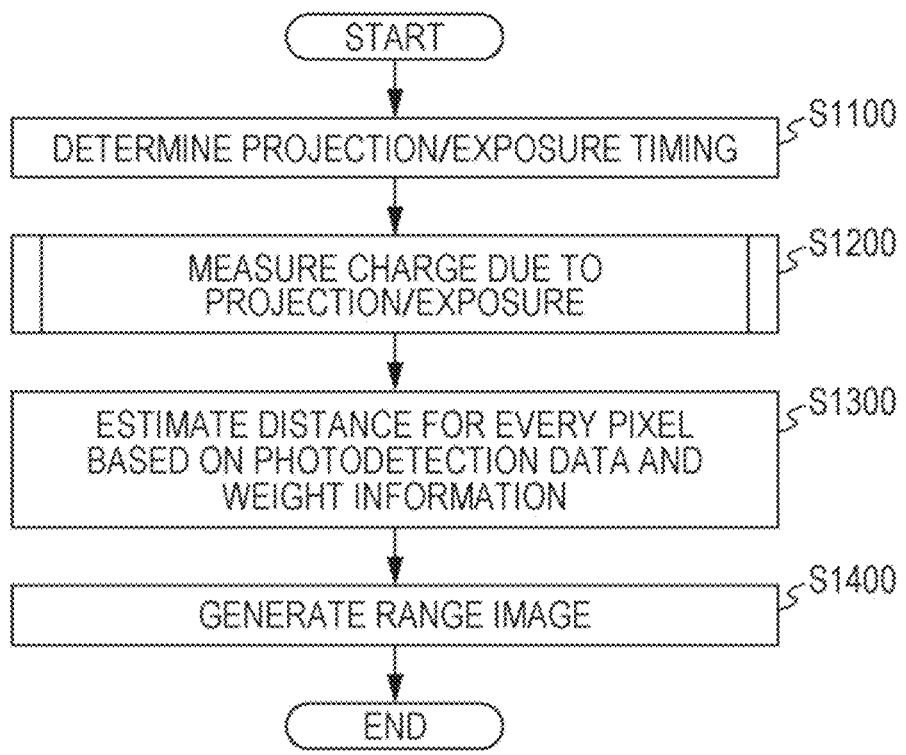
FIG. 15 is a flowchart illustrating an overview of operation of the range-information acquiring apparatus according to Embodiment 1.

Operation of the range-information acquiring apparatus according to Embodiment 1 is described below. FIG. 15 is a flowchart illustrating an overview of operation of the range-information acquiring apparatus according to Embodiment 1. The range-information acquiring apparatus executes steps S1100 to S1400 illustrated in FIG. 15. Each of these steps is described below.

Step S1100

First, the control circuit 300 determines the timing of projection of each of short-range beams and long-range beams by the light source 100, and the timing of exposure of the image sensor 200. The projection and exposure timings will be described in detail later.

Step S1200

Subsequently, in accordance with the determined projection timing, the control circuit 300 transmits a control signal to the light source 100 that instructs the light source 100 to project light. Further, in accordance with the determined exposure timing, the control circuit 300 transmits a control signal to the image sensor 200 that instructs the image sensor 200 to start and end exposure. As a result, plural long-range beams and plural short-range beams are emitted from the light source 100, and charge is accumulated in each photodetector element of the image sensor 200. In Embodiment 1, two exposure periods are set as mentioned above. The image sensor 200 outputs photodetection data responsive to the amount of charge accumulated in each photodetector element during each exposure period.

Step S1300

Subsequently, the signal processing circuit 400 acquires the photodetection data output at step S1200, and the weight information 313 stored on the storage medium 310 of the control circuit 300. The signal processing circuit 400 estimates range information for every pixel based on the acquired photodetection data and the acquired weight information 313. To obtain range information for every pixel from photodetection data acquired for each of the first exposure period and the second exposure period, the signal processing circuit 400 executes a reconstruction process based on compressed sensing. This process is executed by the distance estimator 410 illustrated in FIG. 3.

Step S1400

The signal processing circuit 400 generates a range image by replacing, for example, with a color space, the value of distance for each pixel calculated at step S1300. The range image may not necessarily be represented in color scale. Alternatively, a two-dimensional distance may be represented in gray scale or other methods. Generation of a range image is executed by the image generator 430 illustrated in FIG. 3. The signal processing circuit 400 may generate and output data representative of the distance to one or more objects, without generating a range image.

1-2-1. Projection/Reception Timing

Reference is now made to an example of the timing of projection of each light beam and the timing of exposure in accordance with Embodiment 1.

Figure 16:
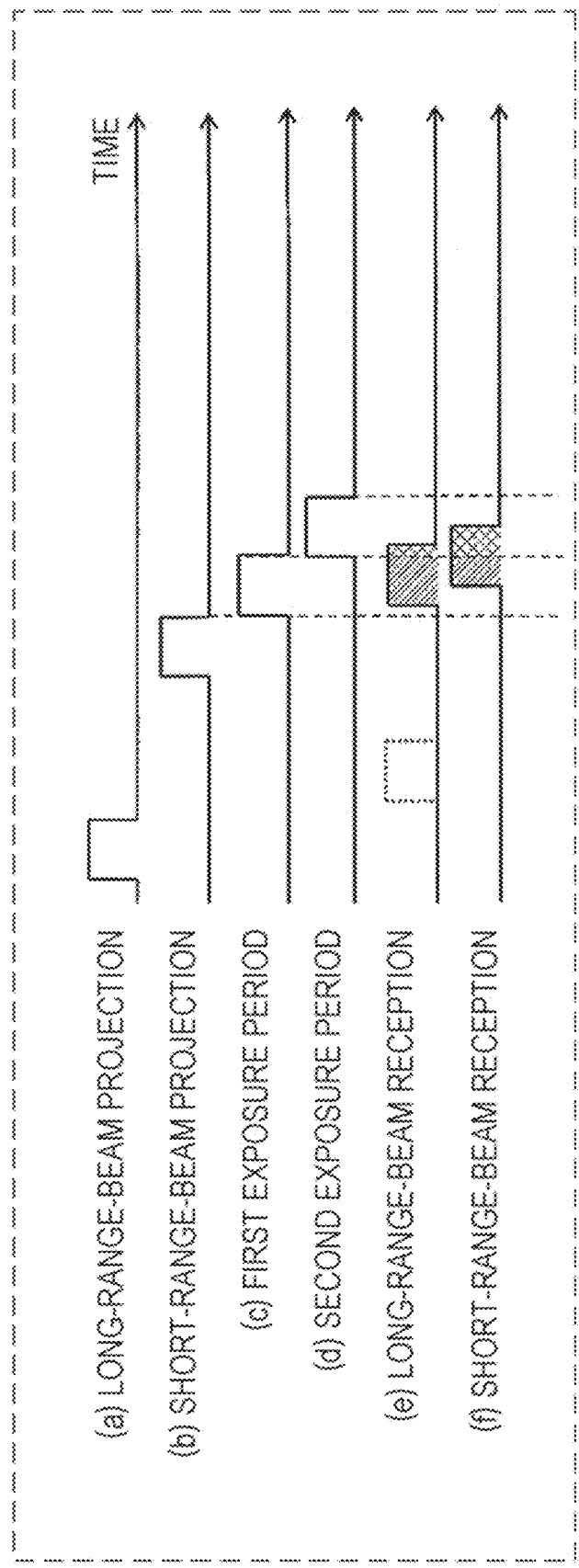
FIG. 16 illustrates an example of the timing of projection of each light beam and the timing of exposure in accordance with Embodiment 1.

FIG. 16 schematically illustrates an example of the timing of projection of each light beam and the timing of exposure in accordance with Embodiment 1. FIG. 16(*a*) illustrates the timing of long-range-beam projection. FIG. 16(*b*) illustrates the timing of short-range-beam projection. FIG. 16(*c*) illustrates a first exposure period. FIG. 16(*d*) illustrates a second exposure period.

The first exposure period starts simultaneously with the end of short-range-beam projection, and ends with the elapse of time equal to the pulse width of each beam. The second exposure period starts with the end of the first exposure period, and ends with the elapse of time equal to the first exposure period.

The solid pulse in FIG. 16(*e*) represents the timing when the reflected light of the long-range beam reflected by a distant object (e.g., an object located in the range of 100 m to 200 m from the range-information acquiring apparatus) returns to the range-information acquiring apparatus. The dashed pulse in FIG. 16(*e*) represents the timing when the reflected light of the long-range beam reflected by a near object (e.g., an object located in the range of less than 100 m from the range-information acquiring apparatus) returns to the range-information acquiring apparatus. FIG. 16(*f*) represents the timing when the reflected light of the short-range beam reflected by a near object (e.g., an object located in the range of less than 100 m from the range-information acquiring apparatus) returns to the range-information acquiring apparatus.

The projection of long-range beams precedes the projection of short-range beams. Each exposure period is set such that both a long-range beam reflected at a long distance and a short-range beam reflected at a short distance are received in at least one of the two exposure periods.

The dashed pulse in FIG. 16(*e*) represents the reflected light of the long-range beam that has returned after being reflected by a near object. This reflected light returns to the range-information acquiring apparatus at a time that falls outside all exposure periods. The image sensor 200 thus does not detect this light. The image sensor 200 does not detect the long-range light beam reflected by an object located at a distance of, for example, less than 100 m. The short-range light beam has a smaller energy per unit area on the irradiated surface than the long-range light beam, and thus has a shorter maximum range than the long-range light beam. Therefore, if the short-range beam is reflected by an object located at a distance of, for example, greater than or equal to 100 m from the range-information acquiring apparatus, the short-range beam is undetectable due to attenuation of its intensity. Thus, the short-range light beam will not be detected in the exposure periods corresponding to the next and subsequent projections of light. The short-range light beam and the long-range light beam may have the same maximum range. In that case as well, providing a sufficient interval of time before the next projection of light helps to ensure that the short-range light beam reflected by a distant object will not be detected in the next and subsequent exposure periods.

In the example illustrated in FIG. 16, the second exposure period starts immediately with the end of the first exposure period. The image sensor 200 includes two charge accumulators per pixel, and is thus able to switch, for each exposure period, which charge accumulator is used to accumulate charge. In the present example, after the first exposure period and the second exposure period end, a period for outputting charge accumulated in each charge accumulator may be provided.

By contrast, if the image sensor 200 includes one charge accumulator per pixel, a period for outputting accumulated charge is provided after the end of each exposure period. In such a case, as illustrated in FIG. 17, exposure is performed only once for each single long-range-beam projection and short-range-beam projection, and when each beam is projected next time, exposure may be performed at a timing different from the previous one.

Figure 17:
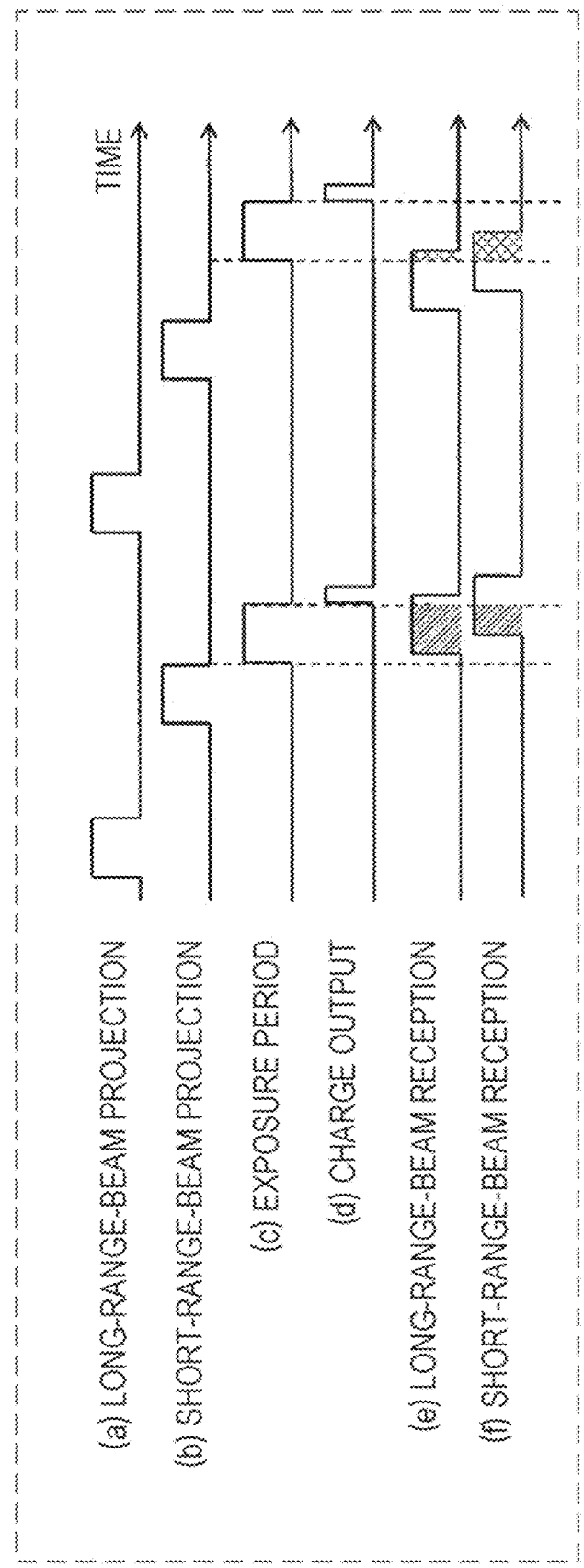
FIG. 17 schematically illustrates another example of the timing of projection of each light beam and the timing of exposure in accordance with Embodiment 1.

FIG. 17 illustrates an example of the timings of projection and exposure for a case where a period for charge output is provided after each exposure period. In this example, in the first exposure period subsequent to the projection of the long-range and short-range beams, the image sensor 200 accumulates and outputs the charge due to the reflected light of each beam. Then, after the elapse of a predetermined time, long-range and short-range beams are projected under the same conditions as the previous time. When, after the end of this second short-range-beam projection, an amount of time corresponding to the first exposure period elapses, the second exposure period is started. In the second exposure period, the image sensor 200 accumulates and outputs the charge due to the reflected light of each beam. As described above, in the example illustrated in FIG. 17, the image sensor 200 outputs charge every time exposure ends. Accordingly, the light source 100 performs projection of light plural times in succession by using a combination of long-range and short-range beams under the same conditions. Exposure of the image sensor 200 is performed at a different timing for each projection. This makes it possible to acquire a voltage due to the charge accumulated in each exposure period.

The number of exposure periods is not limited to two. Three or more consecutive exposure periods may be provided. The timings of projection and exposure may differ from the timings mentioned above. The timings of projection and reception may be adjusted in accordance with various conditions including the distance range setting for each light beam.

For the case illustrated in FIG. 17 as well, that is, for a case where exposure is performed only once after each projection of long-range and short-range beams, the image sensor 200 may include two charge accumulators per pixel, and switch, for each exposure period, which charge accumulator is used to accumulate charge. In this case, the image sensor 200 may, after repeating projection and exposure plural times, output charge accumulated in each charge accumulator.

1-2-2. Measurement of Charge Due to Projection/Exposure

Detailed reference is now made to the charge measurement at step S1200.

Figure 18:
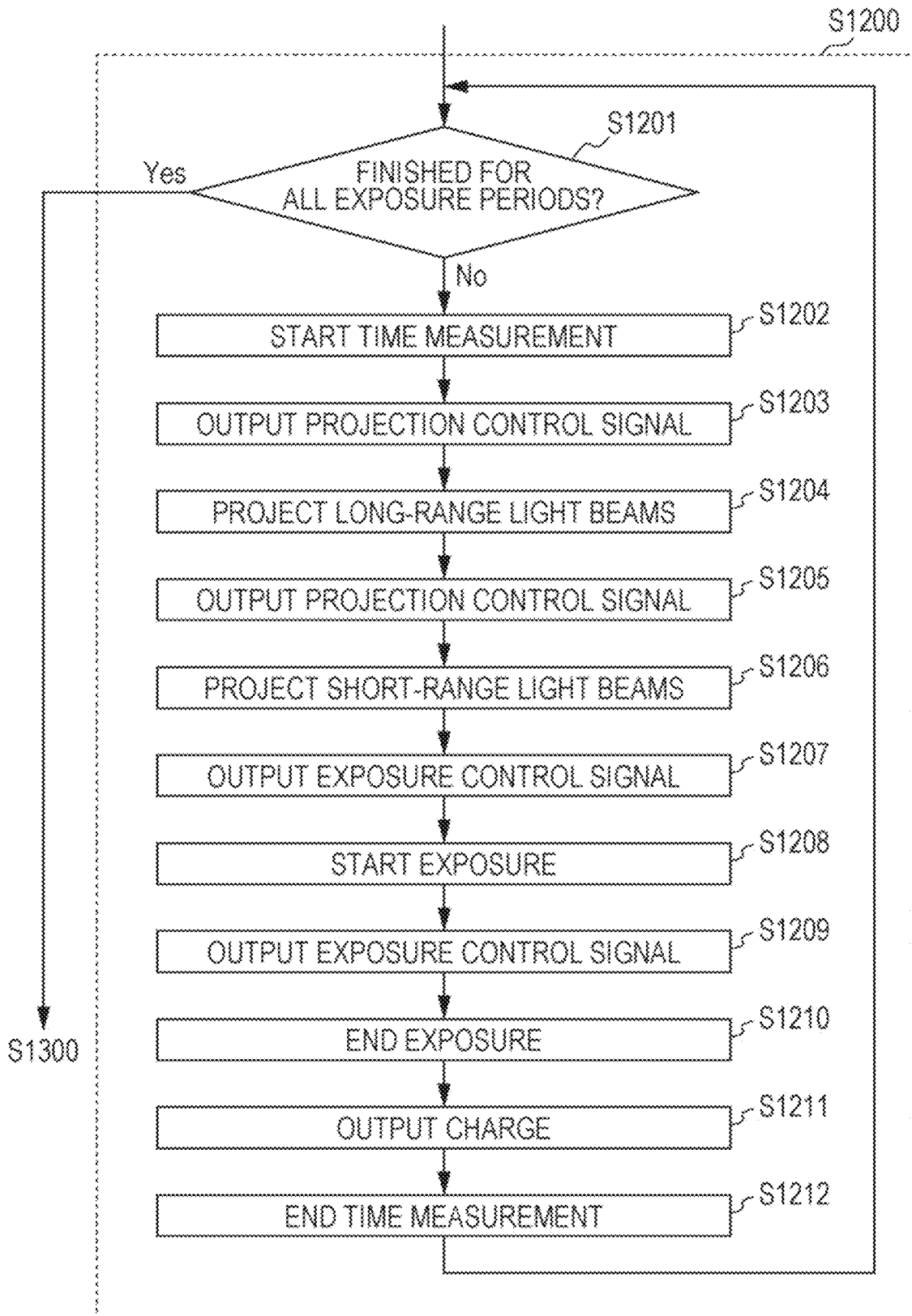
FIG. 18 is a flowchart illustrating exemplary charge measurement.

FIG. 18 is a flowchart of the charge measurement illustrated in the example of FIG. 17. The range-information acquiring apparatus executes steps S1201 to S1212 illustrated in FIG. 18. Each of these steps is described below.

Step S1201

The control circuit 300 determines whether charge measurement has been finished for all exposure periods determined at step S1100. If charge measurement has been finished for all exposure periods, the flowchart proceeds to step S1300. If charge measurement has not been finished yet for all exposure periods, the flowchart proceeds to step S1202.

Step S1202

The control circuit 300 starts measurement of time in order to control projection and exposure.

Step S1203

The control circuit 300 outputs a projection control signal to the light source 100 at the timing of long-range-beam projection determined at step S1100. The projection control signal includes information about the shape, divergence angle, and direction of each light beam represented by the long-range beam information 311, and information about the projected pulse duration determined at step S1100.

Step S1204

The light source 100 generates and projects long-range beams in accordance with the projection control signal output at step S1203.

Step S1205

The control circuit 300 outputs a projection control signal to the light source 100 at the timing of short-range-beam projection determined at step S1100. The projection control signal includes information about the shape, divergence angle, and direction of each light beam represented by the short-range beam information 312, and information about the projected pulse duration determined at step S1100.

Step S1206

The light source 100 generates and projects short-range beams in accordance with the projection control signal output at step S1203.

Step S1207

The control circuit 300 selects, from among plural exposure periods determined at step S1100, one exposure period for which exposure has not been performed yet. The control circuit 300 outputs an exposure start signal to the image sensor 200 at the timing when the selected exposure period starts.

Step S1208

The image sensor 200 starts exposure in accordance with the exposure start signal output at step S1207.

Step S1209

The control circuit 300 outputs an exposure end signal to the image sensor 200 at the timing when the exposure period selected at step S1207 ends.

Step S1210

The image sensor 200 ends exposure in accordance with the exposure end signal output at step S1209.

Step S1211

The image sensor 200 outputs photodetection data responsive to the amount of charge accumulated in each pixel during the period of time from the start of exposure to the end of exposure.

Step S1212

The control circuit 300 ends measurement of time. After step S1212, the flowchart returns to step S1201.

Through the series of steps S1201 to S1212, projection of light by the light source 100, and exposure of the image sensor 200 are performed. For each exposure period, photodetection data responsive to the amount of charge accumulated in each pixel of the image sensor 200 is output.

1-2-3. Reconstruction of Range Information for Every Pixel

Detailed reference is now made to the operation at step S1300 illustrated in FIG. 15. At step S1300, the signal processing circuit 400 uses weight information to estimate distance for every pixel, from photodetection data acquired for each exposure period at step S1200.

By solving Formula 6 mentioned above for the vector X under the condition that the vector Y and the matrix W are known, the value of distance for each pixel can be obtained. However, it is not possible to solve Formula 6 uniquely due to the greater number of elements of the vector Y than the number of elements of the vector X. Accordingly, a constraint is introduced to transform Formula 6 as below.

$$\min_x \left\{ \frac{1}{2} \|WX - Y\|_2^2 + \alpha \|X\|_1 + \beta TV(MX) \right\} \quad (13)$$

The matrix M is an L×(L×N) matrix represented by Formula 14 below.

$$M = \begin{bmatrix} 1, 2, 3, 4, \ldots, N, 0, 0, \ldots, 0 \\ \ldots \\ 0, 0, \ldots, 0, 1, 2, 3, 4, \ldots, N \end{bmatrix} \quad (14)$$

That is, the vector MX is a vector with a number of elements L representing the distance for each pixel.

The first term of Formula 13 is obtained by relaxing Formula 6 to the squared error. The second term represents the L1 norm of the vector X, and is a constraint term because many elements of the vector X are 0. TV(MX) in the third term is a total variation representing the absolute sum of brightness variations among neighboring pixels in the vector MX representing a range image. α and β represent weighting factors. Details of total variation are disclosed in, for example, Rudin L. I., Osher S. J., and Fatemi E., "Nonlinear total variation based noise removal algorithms", Physica D, vol. 60, pp. 259-268, 1992. The entire disclosure of the document is incorporated herein by reference.

Formula 13 represents a computation for determining the vector X that minimizes the value in the curly brackets. Formula 13 can be solved by, for example, using the alternating direction method of multipliers (ADMM). Details of ADMM are disclosed in, for example, D. Gabay and B. Mercier, "A dual algorithm for the solution of nonlinear variational problems via finite-element approximations", Computers & Mathematics with Applications, vol. 2, pp. 17-40, 1976. The entire disclosure of the document is incorporated herein by reference.

1-3. Advantages

As described above, the range-information acquiring apparatus according to Embodiment 1 includes the light source 100, the image sensor 200, the control circuit 300, and the signal processing circuit 400. The light source 100 is capable of simultaneously emitting plural light beams in different directions. The image sensor 200 has plural photodetector elements, and outputs photodetection data responsive to the amount of light received by each photodetector element during a specified exposure period. The control circuit 300 causes the light source 100 to emit first light toward a scene, the first light including plural long-range beams and having a first spatial distribution. Then, the control circuit 300 causes the light source 100 to emit second light toward the scene, the second light including plural short-range beams and having a second spatial distribution. The second spatial distribution differs from the first spatial distribution. Each short-range beam has an energy per unit area on an irradiated surface lower than the energy of each long-range beam per unit area on the irradiated surface, the irradiated surface being located at a predetermined distance from the light source. The control circuit 300 causes the photodetector elements of the image sensor 200 to detect first reflected light and second reflected light in the same exposure period, the first reflected light being caused by reflection of the first light from the scene, the second reflected light being caused by reflection of the second light from the scene. The signal processing circuit 400 generates and outputs range data based on photodetection data output from the image sensor 200, the range data being derived from the first reflected light and the second reflected light.

In particular, the signal processing circuit 400 according to Embodiment 1 generates range data by employing the technique of compressed sensing using weight information of a reception pattern associated with a light beam projection pattern. The range data includes range information estimated for one or more pixels corresponding to photodetector elements that receive neither the first reflected light nor the second reflected light.

The above-mentioned configuration makes it possible to obtain range information for every pixel from sparse light beams. The light beams do not need to cover the entire scene. This makes it possible to reduce the energy of emitted light. Further, use of compressed sensing reduces image degradation such as stretching or blur encountered in linear interpolation, thus allowing for more natural range information. Further, by adjusting the timing of projection of long-range light beams and the timing of projection of short-range light beams so that their reflections are received simultaneously, ranging at long distance range and ranging at short distance range can be performed simultaneously. This makes it possible to reduce the time required for ranging in comparison to performing ranging at long range and ranging at short range individually. As a result, the time required for ranging can be reduced even for ranging performed over greater distance ranges. If a range image is to be generated as a moving image, a smoother moving range image can be generated at an increased frame rate. Further, the increased frame rate makes it possible to generate a high-precision range image by use of information in the temporal direction.

In Embodiment 1, for a reconstruction process using compressed sensing, Formula 6 is defined, and calculation using Formula 13 is performed. In this regard, however, the definitions of X, Y, and W in Formula 6 are not limited to those mentioned above but other definitions may be used. Although Formula 13 is set as a method for obtaining X in Formula 6, X may not necessarily be obtained by the method using Formula 13 but may be obtained by other methods.

Modification of Embodiment 1

Reference is now made to an exemplary modification of Embodiment 1 of the present disclosure.

Embodiment 1 uses two kinds of light beams with different maximum ranges, that is, short-range and long-range beams to measure the distance from the range-information acquiring apparatus to an object. By contrast, this modification uses two sets of light beams that have an equal maximum range and differ in their distribution on a plane parallel to the photodetection surface of the image sensor 200. Each set of light beams may include plural light beams.

The following description will mainly focus on differences from Embodiment 1.

Figure 19:
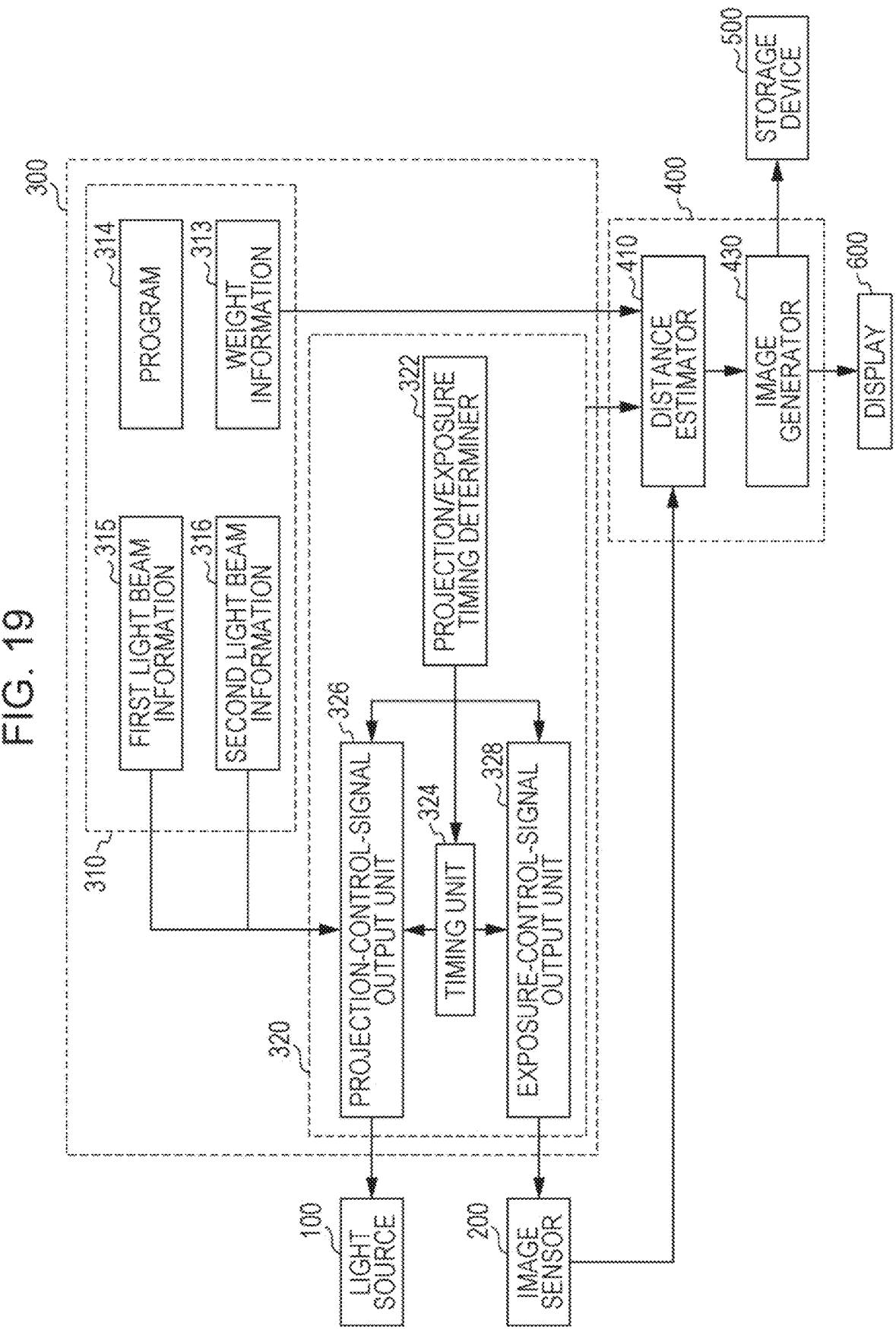
FIG. 19 schematically illustrates an example of the timing of projection of each light beam and the timing of exposure in accordance with a modification of Embodiment 1.

FIG. 19 is a block diagram illustrating an exemplary configuration of a range-information acquiring apparatus according to this modification. The configuration in FIG. 19 is identical to the configuration in FIG. 3 except that the long-range beam information 311 is replaced with first light beam information 315, and that the short-range beam information 312 is replaced with second light beam information 316.

The light source 100 according to this modification emits plural light beams with an equal maximum range in two different spatial patterns. Both spatial patterns are accomplished by emission of plural light beams in random directions. Each light beam may have a maximum range of, for example, 0 m to 200 m. That is, the first and second light beams according to this modification each have a maximum range corresponding to the maximum range of long-range beams according to Embodiment 1 mentioned above. The maximum range of each light beam is not limited to the above-mentioned range but may be set as appropriate in accordance with the intended application.

In this modification as well, the control circuit 300 determines the timing of light beam projection by the light source 100, and the timing of exposure of the image sensor 200, and in accordance with the determined timings, the control circuit 300 outputs an exposure control signal and a projection control signal. The projection control signal is generated in accordance with the first light beam information 315 and the second light beam information 316, which are pre-stored on the storage medium 310. The first light beam information 315 may include information related to the direction of emission and shape of each first light beam. The second light beam information 316 may include information related to the direction of emission and shape of each second light beam.

Figure 20A:
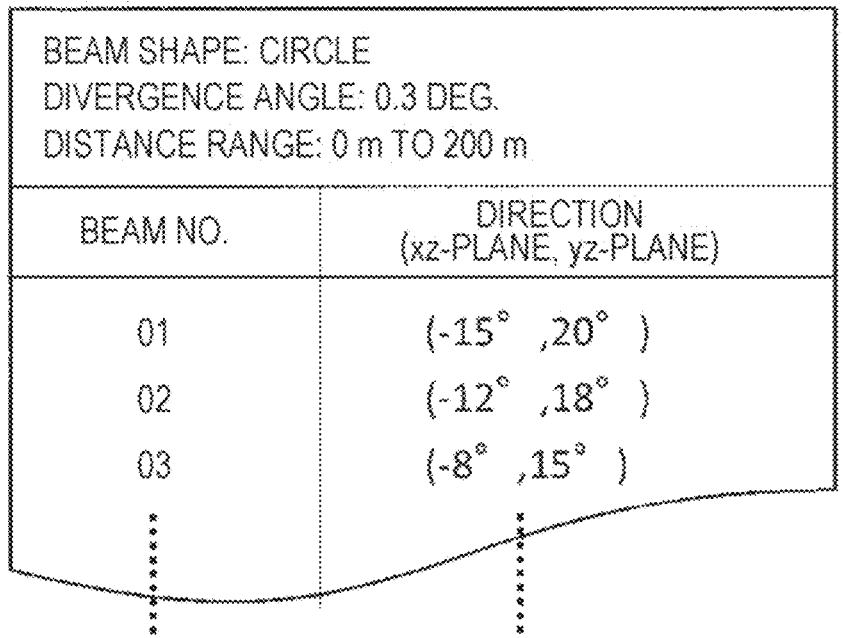
FIG. 20A illustrates exemplary first light beam information in accordance with the modification of Embodiment 1.
Figure 20B:
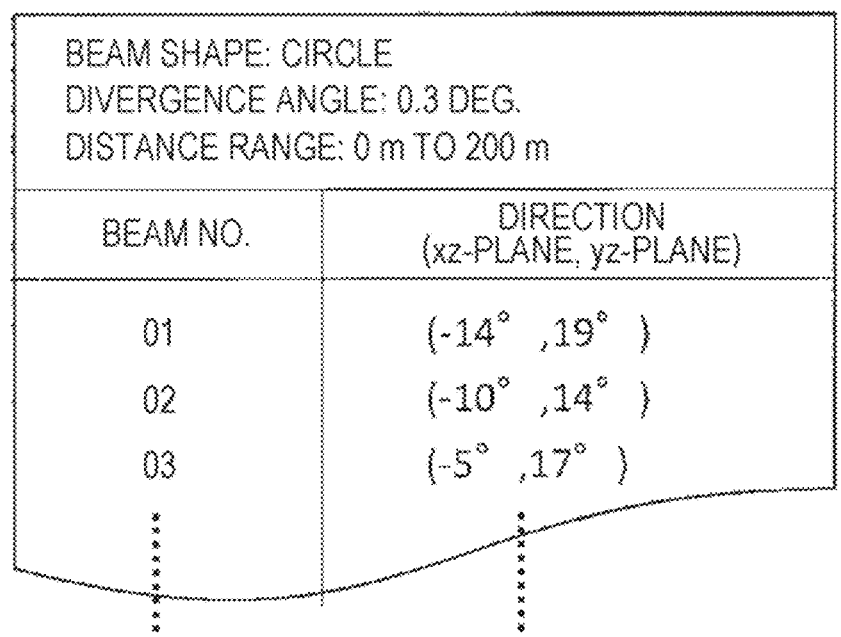
FIG. 20B illustrates exemplary second light beam information in accordance with the modification of Embodiment 1.

FIG. 20A illustrates an example of the first light beam information 315. FIG. 20B illustrates an example of the second light beam information 316. In the present example, the first light beams and the second light beams are identical in shape, divergence angle, and distance range but differ in the combination of the directions of light beam emission. This, however, is not intended to be limiting. Alternatively, for example, the first light beams and the second light beams may differ in shape and/or divergence angle.

The directions of the first light beams and the second light beams are determined randomly. The first light beams have a spatial distribution different from the spatial distribution of the second light beams. The number of the first light beams and the number of the second light beams are both less than the number of light beams required to cover the entire scene to be ranged.

In this modification, as with Embodiment 1, the period of time in which the first light beam is reflected by an object located at a first distance range, which is relatively long, and then arrives at the image sensor 200, and the period of time in which the second light beam is reflected by an object located at a second distance range, which is relatively short, and then arrives at the image sensor 200 overlap each other at least partially. The timing of emission of each light beam and the timing of exposure are adjusted to satisfy the above-mentioned condition. The first distance range may be set to, for example, 100 m to 200 m, and the second distance range mat be set to, for example, 0 m to 100 m. The exposure time of the image sensor 200 is adjusted such that the first light beam reflected by an object located at a distance outside the first distance range, and the second light beam reflected by an object located at a distance outside the second distance range are not detected by the image sensor 200. In other words, even if an object exists in the direction of radiation of each of the first light beam and the second light beam, only one of the two beams is detected by the image sensor 200.

If the pixel pitch is sufficiently small, and there is no pixel that is divided by the contour of an object into parts lying inside and outside the object, the photodetection surface of the image sensor 200 has no pixel that receives both the first light beam and the second light beam. In this case, there may exist only the following three kinds of pixels: pixels that receive neither the first light beam nor the second light beam; pixels that receive only the first light beam; and pixels that receive only the second light beam. If, however, there is any pixel that is divided by the contour of an object into parts lying inside and outside the object, such a pixel may receive both the first light beam and the second light beam. In that case, there may exist the following four kinds of pixels: pixels that receive neither the first light beam nor the second light beam; pixels that receive only the first light beam; pixels that receive only the second light beam; and pixels that receive both the first light beam and the second light beam. The above-mentioned pixel states correspond to Formulae 2 to 5 mentioned above.

FIG. 21 schematically illustrates an example of the timing of projection of each light beam and the timing of exposure according to this modification. FIG. 21(a) illustrates the timing of projection of each first light beam. The pulse at the left-hand side represents the k-th projection, and the pulse at the right-hand side represents the (k+1)-th projection. FIG.

21(b) illustrates the timing of projection of each second light beam. FIG. 21(c) illustrates a first exposure period. FIG. 21(d) illustrates a second exposure period.

The first exposure period starts simultaneously with the end of projection of the second light beam, and ends with the elapse of time equal to the pulse width of each beam. The second exposure period starts with the end of the first exposure period, and ends with the elapse of time equal to the first exposure period.

The solid pulse in FIG. 21(e) represents the timing when the reflected light of the first light beam reflected by a distant object (e.g., an object located in the range of 100 m to 200 m from the range-information acquiring apparatus) returns to the range-information acquiring apparatus. The dashed pulse in FIG. 21(e) represents the timing when the reflected light of the first light beam reflected by a near object (e.g., an object located in the range of less than 100 m from the range-information acquiring apparatus) returns to the range-information acquiring apparatus. The solid pulse in FIG. 21(f) represents the timing when the reflected light of the second light beam reflected by a near object (e.g., an object located in the range of less than 100 m from the range-information acquiring apparatus) returns to the range-information acquiring apparatus. The dashed pulse in FIG. 21(f) represents the timing when the reflected light of the second light beam reflected by a distant object returns to the range-information acquiring apparatus.

The projection of the first light beam precedes the projection of the second light beam. Each exposure period is set such that both the first light beam reflected at a long distance and the second light beam reflected at a short distance are received in at least one of the two exposure periods.

The reflected light of the first light beam reflected at a short distance, which is represented by the dashed line in FIG. 21(e), returns to the range-information acquiring apparatus at a time that falls outside all exposure periods. Accordingly, the image sensor 200 does not detect such light. The image sensor 200 does not detect the first light beam reflected by an object located at a distance of, for example, less than 100 m. That is, exposure of the image sensor 200 is not performed during an interval of time in which the first light beam reflected by an object located at a distance of, for example, less than 100 m arrives at the range-information acquiring apparatus.

Likewise, the reflected light of the second light beam reflected at a long distance, which is represented by the dashed line in FIG. 21(f), returns to the range-information acquiring apparatus at a time that falls outside all exposure periods. Accordingly, the image sensor 200 does not detect such light. The image sensor 200 does not detect the second light beam reflected by an object located at a distance of, for example, greater than or equal to 100 m from the range-information acquiring apparatus. Further, the timing of the (k+1)-th pulse depicted at the right-hand side of FIG. 21(a) is set at a sufficient interval of time from the k-th pulse depicted at the left-hand side. This interval of time may be set to be longer than the time it takes from the k-th projection of the second light beam to the return of the second light beam after being reflected by a distant object. This helps to ensure that the second light beam reflected by a distant object is not detected in the next and subsequent exposure periods. More specifically, the time until the next projection of light may be set such that the exposure period that occurs first with respect to the next projection starts after the elapse of the longest time it takes from the projection of the second light beam to the arrival of the reflection of the second light beam at the range-information acquiring apparatus.

This modification uses two kinds of light beams with the same maximum range to achieve ranging at plural distance ranges through the control of projection and exposure timings. This makes it possible to attain the same effect as the use of two kinds of light beams with different maximum ranges in Embodiment 1. This modification is similar to Embodiment 1 in how the control circuit 300 operates, and how the signal processing circuit 400 estimates distance for each pixel. It is to be noted, however, that the value of each element w of the weight matrix W in Formula 9 is adjusted in accordance with descriptions of the first light beam information 315 and the second light beam information 316.

Although two distance ranges are assigned to the first and second light beams in the foregoing description of this modification, three or more distance ranges may be assigned to three or more kinds of light beams. In that case, the projection conditions for the three or more kinds of light beams may be set such that each kind of light beam differs in its location on a plane parallel to the photodetection surface.

In the foregoing description of Embodiment 1 and its modification, light beams with different spatial distributions are radiated sequentially. Alternatively, light beams with exactly the same two-dimensional spatial distribution or with exactly with same three-dimensional spatial distribution may be radiated sequentially. If light beams are identical in spatial distribution, the weight information 313 illustrated in each of FIGS. 3 and 19 includes only the following two kinds of information representing the state of each pixel; information representing a pixel to be irradiated with both the first light beam and the second light beam; and information representing a pixel to be irradiated with neither the first light beam nor the second light beam. The distance estimator 410 calculates distance for every pixel based on the weight information 313 that specifies, for each pixel, in which one of the two kinds of states the pixel is. Depending on the condition of a scene or the position of a pixel, there may not be sufficient information for determining which one of two distance ranges, that is, the long and short distance ranges, is to be selected. Accordingly, for example, a constraint such as "give priority to a candidate located at a shorter distance" may be added in estimating distance.

Embodiment 2

Reference is now made to Embodiment 2 representing an exemplary embodiment of the present disclosure.

Embodiment 1 employs the indirect ToF method to measure the distance from the range-information acquiring apparatus to an object. By contrast, Embodiment 2 employs a direct ToF method. The following description will mainly focus on differences from Embodiment 1.

Figure 22:
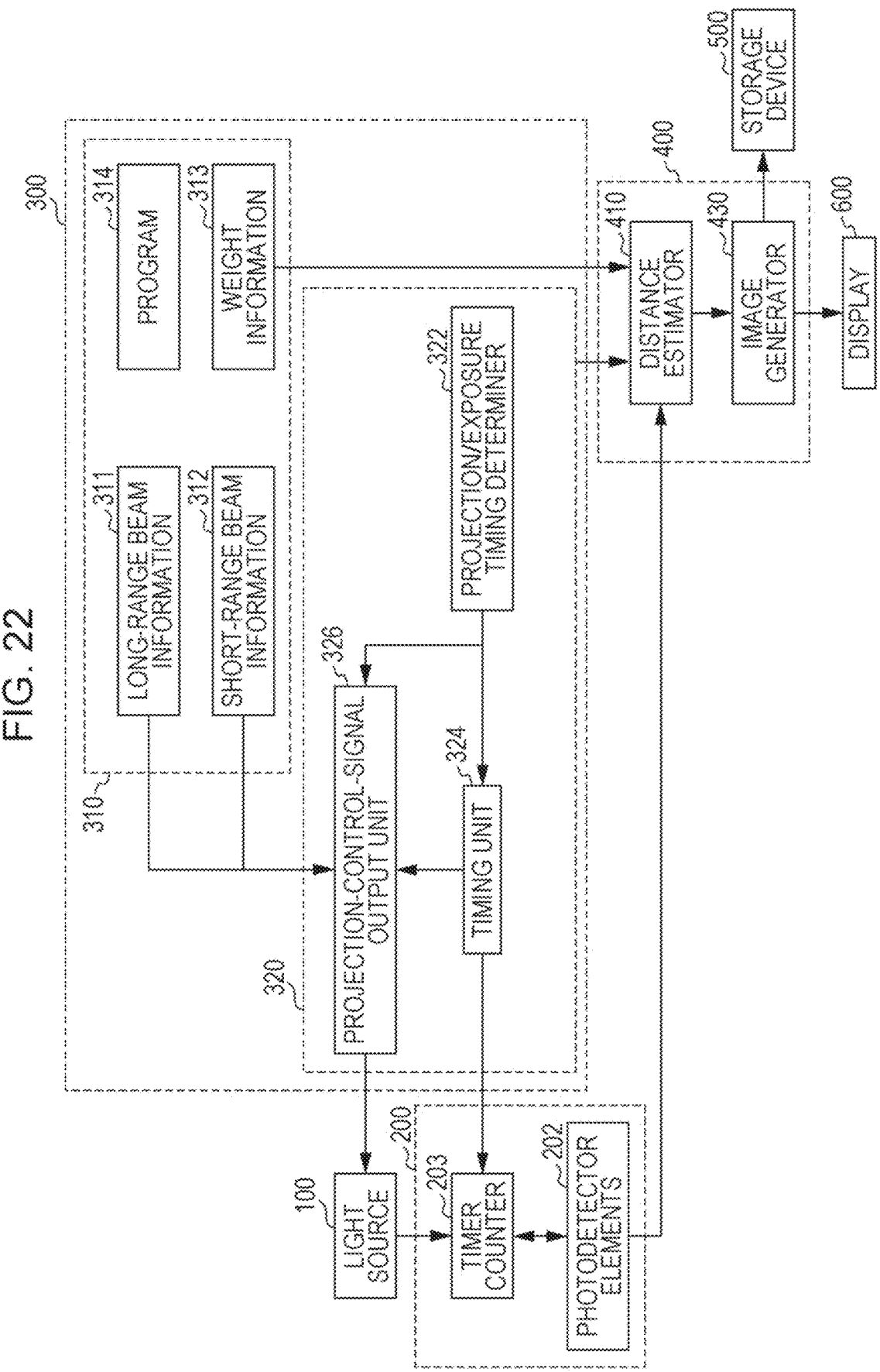
FIG. 22 illustrates the configuration of a range-information acquiring apparatus in accordance with Embodiment 2.

FIG. 22 illustrates the configuration of a range-information acquiring apparatus in accordance with Embodiment 2. In Embodiment 2, the exposure-control-signal output unit 328 illustrated in FIG. 3 is not provided, and the image sensor 200 includes a timer counter 203. Otherwise, Embodiment 2 is similar in configuration to Embodiment 1.

The image sensor 200 according to Embodiment 2 includes a two-dimensional arrangement of plural photodetector elements 202 for each of which the timer counter 203 is provided. The light source 100 outputs a projection signal simultaneously with the start of projection of short-range beams.

In ranging based on the direct ToF method, the time from the start of projection of light to the reception of the reflection of the projected light is measured directly. The timer counter 203 is provided for each photodetector element 202. The timer counter 203 measures the time from when a projection signal is output from the light source 100 to when reflected light is received by the corresponding photodetector element 202. The timer counter 203 measures the time it takes for the first reflected light to be received after the start of time measurement, that is, after the input of a projection signal. Accordingly, if the reflection of a long-range beam and the reflection of a short-range beam arrive at the photodetector element 202 one after the other, the time it takes until the reception of the earlier-arriving one of the two reflections is measured.

Weight information according to Embodiment 2 is described below. As with Embodiment 1, the weight information 313 represents a weight matrix based on the projection pattern of short-range beams and the projection pattern of long-range beams.

A weight matrix W according to Embodiment 2 has a number of rows equal to the pixel count L of the image sensor 200, and a number of columns equal to the pixel count L multiplied by the number of distance analyses N.

Let $x_i$ be the distance vector of a pixel i (i=1, 2, . . . , L) of the image sensor 200. The distance vector $x_i$ is a vector with a number of elements N, and represents the distance range of an object located at the pixel i. For example, $x_i$=[1, 0, 0, 0, . . . , 0]$^T$ represents a distance range of less than 16.7 meters, $x_i$=[0, 1, 0, 0, . . . , 0]T represents a distance range of greater than or equal to 16.7 meters and less than 33.3 meters, and $x_i$=[0, 0, 0, 0, . . . , 1]$^T$ represents a distance range of greater than or equal to (N−1)×16.7 meters and less than N×16.7 meters.

For a pixel irradiated with only a short-range beam or with only a long-range beam, Formula 15 below holds:

$$y_i = w_1^T x_i = 1 \quad (15),$$

where $w_1$ is an N-dimensional vector of which only elements corresponding to observed values are 1 and other elements are 0.

For a pixel simultaneously irradiated with a short-range beam and a long-range beam, Formula 16 below holds:

$$y_i = w_2^T x_i = 1 \quad (16),$$

where $w_2$ is an N-dimensional vector of which only elements corresponding to the respective observed values of short-range and long-range beams are 1 and other elements are 0.

For a pixel irradiated with neither of these beams, Formula 17 below holds:

$$y_i = w_0^T x_i = 0 \quad (17),$$

where $w_0$ is an N-dimensional vector whose elements are all 0.

A combination of Formula 15 to Formula 17 can be represented by Formula 18 as follows:

$$Y = WX \quad (18).$$

In Formula 18, with the pixel count being L, Y is represented by Formula 19 below, and X is represented by Formula 20:

$$Y = [y_1, y_2, \ldots, y_L]^T \quad (19)$$

$$X = [x_1^T, x_2^T, \ldots, x_L^T]^T \quad (20),$$

where Y is a vector representing whether a ToF value has been measured for each pixel, and is an L-dimensional vector whose elements only have a value of 0 or 1. X is a vector in which L above-mentioned vectors $x_i$ each having the number of elements N are arranged, and the vector X has a number of elements equal to L×N. The vector X represents the distance for each individual pixel. More specifically, the vector X indicates in what number distance range an object located at a position corresponding to each pixel is, among plural distance ranges obtained by dividing a distance measurement range by the number of analyses. For each individual pixel, distance is expressed by a value of 0 or 1 given to the element representing each of the above-mentioned distance ranges. $x_i$ is a vector for which only one of its N elements is 1 and the other elements are 0.

W is a matrix with a number of rows L and a number of columns L×N. According to the definitions of $y_i$, $x_i$ mentioned above, the matrix W is represented by Formula 21 below.

$$W = \begin{vmatrix} w & 0 & \ldots & 0 & 0 \\ 0 & w & \ldots & 0 & 0 \\ \vdots & \vdots & \ddots & \vdots & \vdots \\ 0 & 0 & \ldots & \ddots & 0 \\ 0 & 0 & \ldots & 0 & w \end{vmatrix} \quad (21)$$

Each element w of the matrix W in Formula 21 represents one of the matrices $w_1$, $w_2$, and $w_0$ in Formulae 15 to 17. Which one of the matrices $w_1$, $w_2$, and $w_0$ each element w corresponds to may be determined by, for example, performing calibration in advance.

Figure 23:
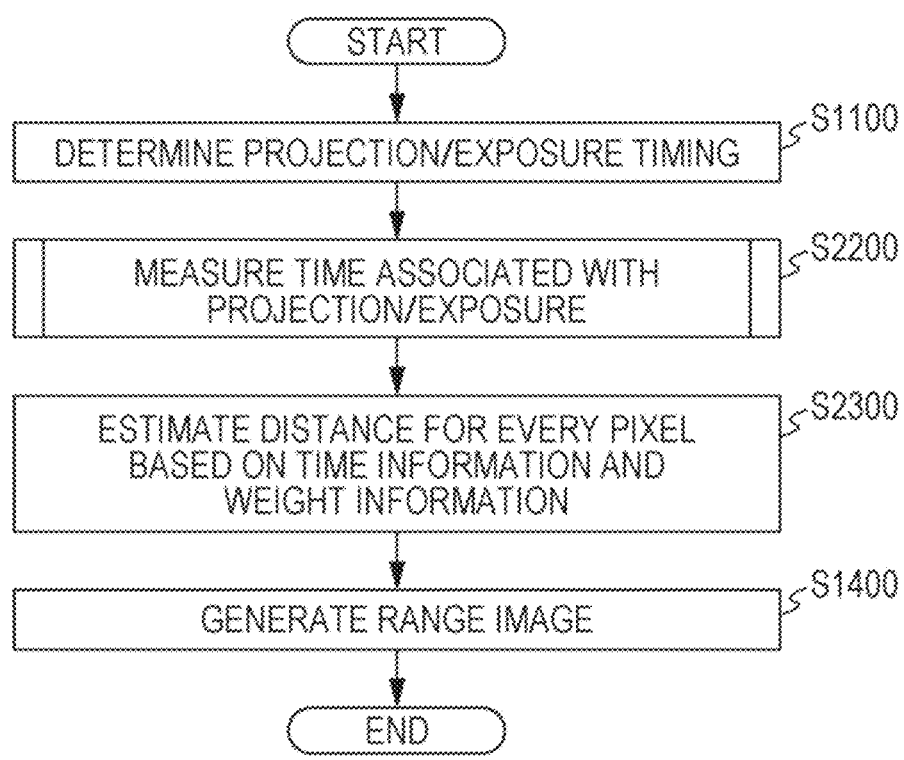
FIG. 23 is a flowchart illustrating an example of operation of the range-information acquiring apparatus in accordance with Embodiment 2.

Reference is now made to operation of the range-information acquiring apparatus according to Embodiment 2. FIG. 23 is a flowchart illustrating an example of operation of the range-information acquiring apparatus according to Embodiment 2. The configuration in FIG. 23 is similar to the configuration in FIG. 15 except that step S1200 in FIG. 15 is replaced with step S2200, and step S1300 is replaced with step S2300. Reference is made below to each operation step.

Step S1100

First, the control circuit 300 determines the timing of projection of each of short-range beams and long-range beams by the light source 100, and the timing of exposure of the image sensor 200.

Step S2200

Subsequently, in accordance with the determined projection timing, the control circuit 300 transmits a projection control signal to the light source 100 that instructs the light source 100 to project long-range beams and short-range beams. The light source 100 outputs a projection signal to the image sensor 200 simultaneously with the projection of short-range beams. In accordance with the projection signal, the image sensor 200 measures, with the timer counter 203, the time until the reception of reflected light. The operation at step S2200 will be described later in detail together with the details of the timings of projection and exposure.

Step S2300

The signal processing circuit 400 acquires the time measured at step S2200, and the weight information 313 stored on the storage medium 310 of the control circuit 300. Based on the acquired time information and the acquired weight information, the signal processing circuit 400 estimates the distance to an object for every pixel. The time information is generated through a reconstruction process that employs compressed sensing.

Step S1400

The image generator 430 of the signal processing circuit 400 generates a range image by replacing, for example, with a color space, the value of distance for each pixel calculated at step S2300. The range image may not necessarily be represented in color scale. Alternatively, a two-dimensional distance may be represented in gray scale or other methods. In Embodiment 2 as well, the signal processing circuit 400 may generate and output data representative of the distance to one or more objects, without generating a range image.

2-2-1. Projection/Reception Timing

Reference is now made to the timing of projection of each light beam and the timing of exposure in accordance with Embodiment 2.

Figure 24:
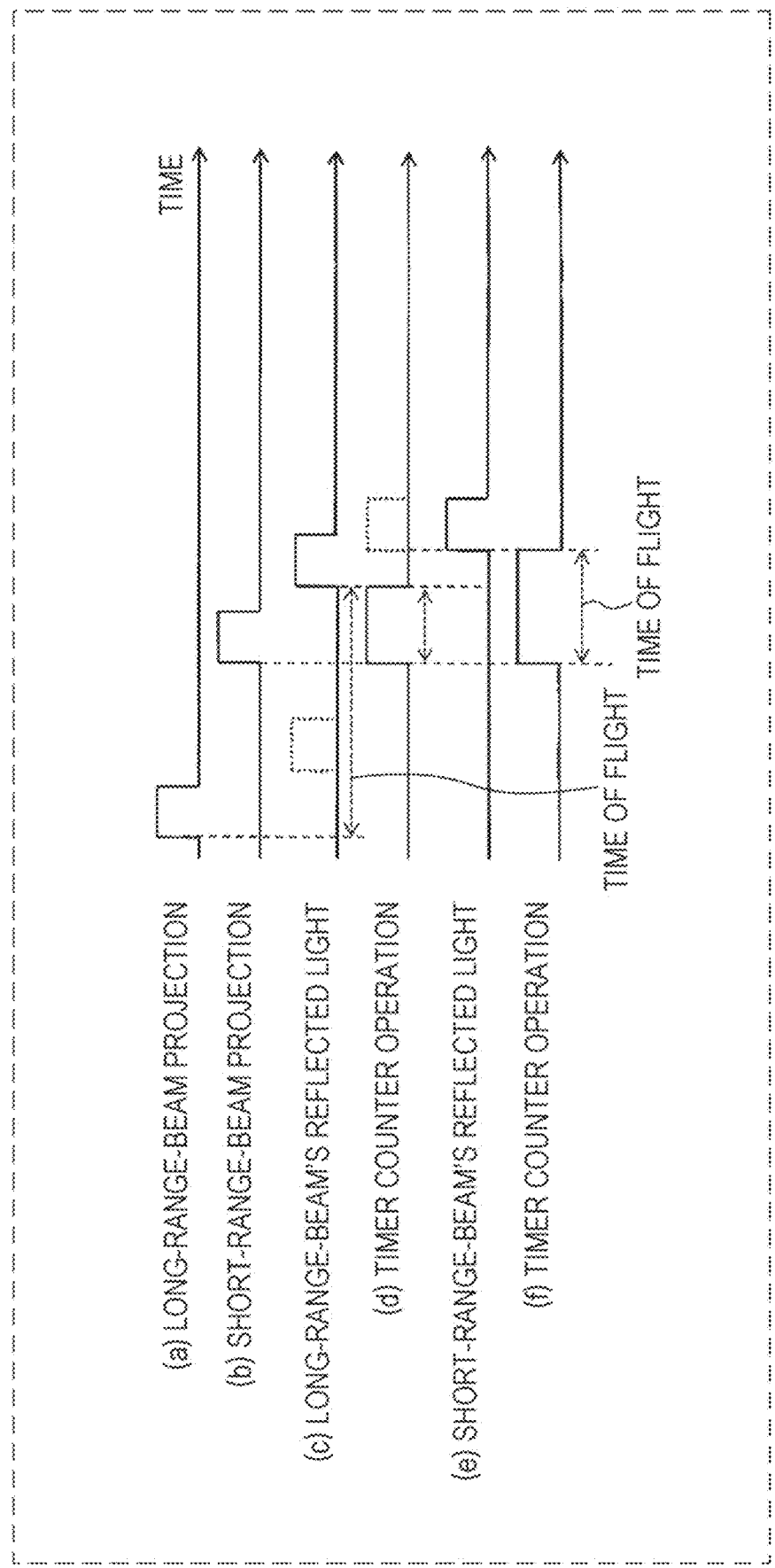
FIG. 24 schematically illustrates an example of the timing of projection of each light beam and the timing of exposure in accordance with Embodiment 2.

FIG. 24 schematically illustrates an example of the timing of projection of each light beam and the timing of exposure in accordance with Embodiment 2. FIG. 24(*a*) illustrates the timing of long-range-beam projection. FIG. 24(*b*) illustrates the timing of short-range-beam projection. FIG. 24(*c*) illustrates an example of the timings when the reflections of long-range beams arrive at the image sensor 200. FIG. 24 (*d*) and FIG. 24(*f*) each illustrate an example of the timing of operation of the timer counter. FIG. 24(*e*) illustrates an example of the timing when the reflection of a short-range beam arrives at the image sensor 200.

The projection of long-range beams precedes the projection of short-range beams. The exposure timing, that is, the timing of operation of the timer counter 203 is set such that of a long-range beam reflected at a long distance and a short-range beam reflected at a short distance, the one that arrives earlier at the image sensor 200 is received.

The dashed pulse in FIG. 24(*c*) represents the reflected light of a long-range beam reflected by a near object (e.g., an object located at a distance of less than 100 m). Such reflected light arrives at the image sensor 200 before the start of operation of the timer counter 203, and thus its time of flight is not measured. As for a short-range beam reflected by a near object illustrated in FIG. 24(*e*), its time of flight is normally measured through operation of the timer counter 203 illustrated in FIG. 24(*f*). However, if the reflection of a long-range beam has arrived earlier than the reflection of the short-range beam at the same pixel at which the reflection of the short-range beam is to arrive, then as illustrated in FIG. 24(*d*), the timer counter 203 is already stopped at this point due to the reflection of the long-range beam that has arrived earlier.

In this case, the time of flight of the reflection of the short-range beam is not measured. As with Embodiment 1, the distance between the light source 100 and the image sensor 200 is negligibly small. Consequently, a light beam emitted from the light source 100 is reflected by a nearer object and arrives at the image sensor 200. However, for a pixel located at a position corresponding to the position of the contour of the object, both a long-range beam and a short-range beam can arrive at such a pixel. In that case, the timing of reception of the earlier-arriving one of the two beams is measured.

As illustrated in FIG. 24(*c*) and FIG. 24(*e*), the time counter starts operation simultaneously with the short-range-beam projection. Accordingly, if the reflection of a short-range beam arrives at the image sensor 200 earlier than that of a long-range beam, then the measured time represents the time of flight itself. By contrast, if the reflection of a long-range beam arrives at the image sensor 200 earlier than that of a short-range beam, then the measured time is shorter than the time of flight.

2-2-2. Measurement of Time Associated with Projection/Exposure

Figure 25:
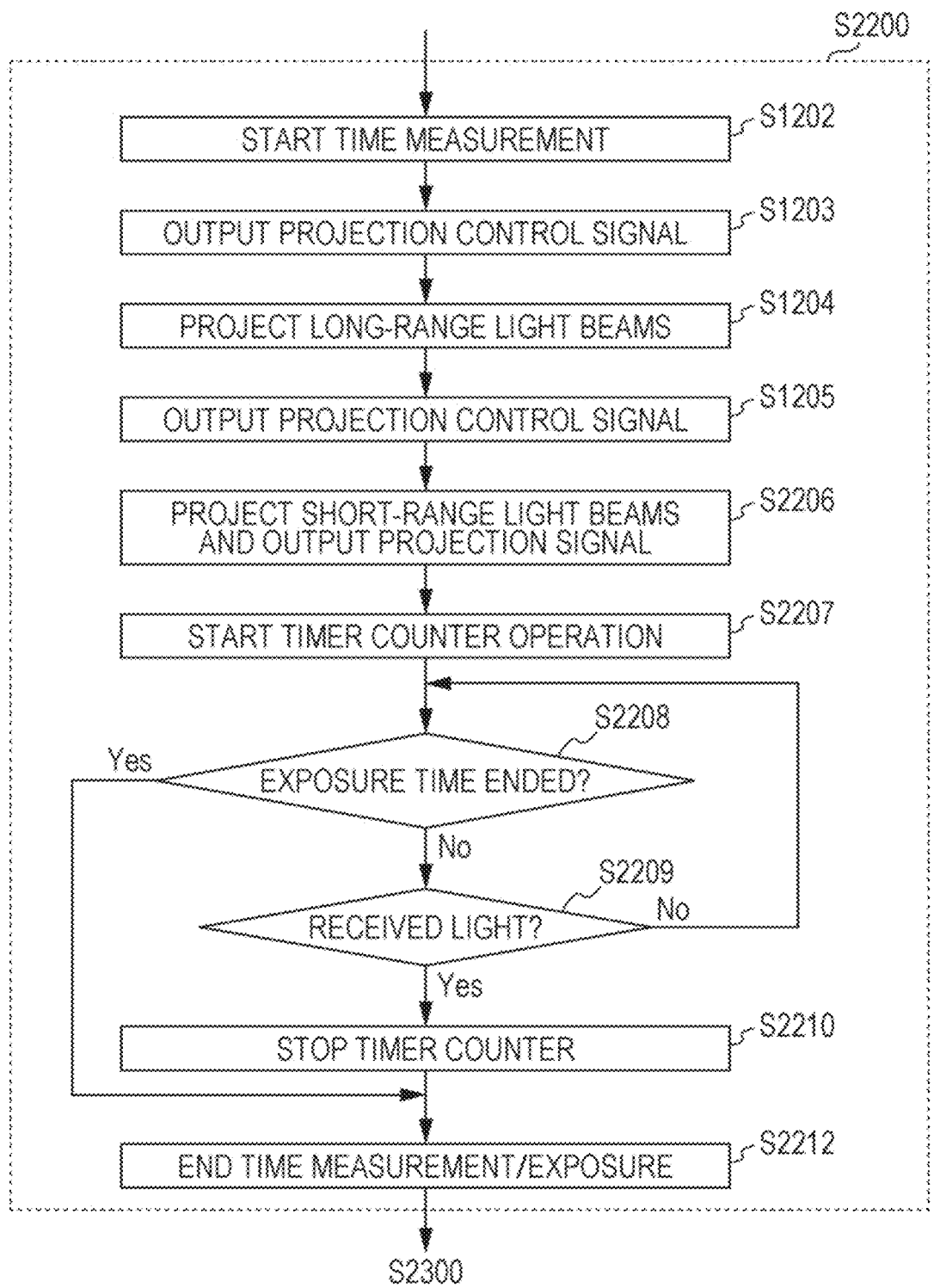
FIG. 25 is a flowchart illustrating measurement of time in accordance with Embodiment 2.

Detailed reference is now made to the measurement of time at step S2200 illustrated in FIG. 23. FIG. 25 is a flowchart illustrating the measurement of time associated with the timing of projection by the light source 100 and the timing of exposure of the image sensor 200 illustrated in FIG. 24. The procedure in FIG. 25 includes operations similar to those illustrated in FIG. 18. The same reference signs as those in FIG. 18 are used to describe these similar operations.

Step S1202

The control circuit 300 starts measurement of time in order to control projection and exposure. The time measurement is performed by the timing unit 324.

Step S1203

The control circuit 300 outputs a projection control signal to the light source 100 at the timing of long-range-beam projection determined at step S1100. The projection control signal includes information about the shape, divergence angle, and direction of each light beam represented by the long-range beam information 311, and information about the projected pulse duration determined at step S1100.

Step S1204

The light source 100 generates and projects long-range beams in accordance with the projection control signal output at step S1203.

Step S1205

The control circuit 300 outputs a projection control signal to the light source 100 at the timing of short-range-beam projection determined at step S1100. The projection control signal includes information about the shape, divergence angle, and direction of each light beam represented by the short-range beam information 312, and information about the projected pulse duration determined at step S1100.

Step S2206

The light source 100 generates and projects short-range beams in accordance with the projection control signal output at step S1203. At the same time, the light source 100 outputs a projection signal to the image sensor 200.

Step S2207

The image sensor 200 starts operation of the timer counter 203 of each pixel in response to input of the projection signal output from the light source 100.

Step S2208

The image sensor 200 references the timing unit 324 of the control circuit 300 to determine whether the maximum value of the exposure time determined at step S1100 has elapsed. If it is determined at step S2208 that the maximum exposure time has elapsed, the flowchart proceeds to step S2212. If it is determined that the maximum exposure time has not elapsed, the flowchart proceeds to step S2209.

Step S2209

Each photodetector element 202 of the image sensor 200 determines whether light has been received after the start of operation of the timer counter. If it is determined that light has been received, the flowchart proceeds to step S2210. If it is determined that light has not been received, the flowchart returns to step S2208.

Step S2210

Each photodetector element 202 of the image sensor 200 stops the timer counter.

Step S2212

The image sensor 200 references the timing unit 324 of the control circuit 300, and ends exposure upon confirming that the timing to end exposure has been reached. For a pixel for which the time counter has not been stopped, its value is set to 0, and for a pixel for which the timer counter has been stopped, its value is set to the time measured by the timer counter.

By performing the series of steps S2207 to S2212 for each photodetector element of the image sensor 200, time is measured for each pixel.

2-2-3. Reconstruction of Range Information for Every Pixel Based on Time Information of Each Pixel Detailed reference is now made to the operation at step S2300 illustrated in FIG. 23. At step S2300, the signal processing circuit 400 binarizes the time measured for each pixel of the image sensor 200 at step S2200, in accordance with whether the corresponding value exists or not. That is, the time is represented as a binary value, with 1 indicating that the time until the reception of light has been measured, and 0 indicating that the time until the reception of light has not been measured. The signal processing circuit 400 estimates distance for each pixel by use of the weight information 313.

By solving Formula 17 mentioned above for the vector X under the condition that the vector Y and the matrix W are known, the value of distance for each pixel can be generated. However, it is not possible to obtain a unique solution for this formula. Accordingly, a constraint is introduced to transform Formula 17 as below.

$$\min_{x}\left\{\frac{1}{2}\|WX - Y\|_2^2 + \alpha\|X\|_1 + \beta TV(MX)\right\} \quad (22)$$

The matrix M is a L×(L×N) matrix represented by Formula 22 below.

$$M = \begin{bmatrix} 1, 2, 3, 4, \ldots, N, 0, 0, \ldots, 0 \\ \ldots \\ 0, 0, \ldots, 0, 1, 2, 3, 4, \ldots, N \end{bmatrix} \quad (23)$$

That is, the vector MX is a vector with a number of elements L representing the distance for each pixel.

The first term of Formula 21 is obtained by relaxing Formula 17 to the squared error. As with Embodiment 1, by solving for the vector X, the distance for every pixel can be obtained. As the calculation method, for example, a known method such as ADMM may be used.

Although in Embodiment 2 calculation is performed with the observed value $y_i$ converted into a binary value representing whether reflected light has been received or not, this is only intended to be illustrative. As an observed value $y_i$, the actually observed time may be stored separately for use. In that case, if the value of $x_i$ is within a short distance range, a distance is calculated from observed time information, and if the value of $x_i$ is within a long-distance range, a more detailed distance can be acquired from an estimate of $x_i$ by adding, to the distance calculated from observed time information, the distance corresponding to the amount of time that has not been measured. Further, if the above-mentioned calculation method is to be employed, although the foregoing description is directed to a case where N=12, this is intended to be illustrative only. The above-mentioned calculation method may be changed as appropriate. For example, for a pixel that has the possibility of receiving the reflection of one or more of a long-range beam and a short-range beam, N may be set as N=2, that is, the measurement distance range may be classified into a short-distance range and a long-distance range.

Further, for a pixel that receives neither of the reflections of these beams, N may be set to a value greater than or equal to 3. In accordance with a calculated value of $x_i$, if the value is within a short distance range, a distance is calculated from observed time information, and if the value falls is a long-distance range, a more detailed distance can be acquired by adding, to the distance calculated from observed time information, the distance corresponding to the amount of time that has not been measured. For a pixel that receives only the reflection of a short-range beam, and for a pixel that receives only the reflection of a long-range beam, N may be set as N=1, and only for a pixel that has the possibility of receiving the reflections of both a short-range beam and a long-range beam, N may be set as N=2.

Although the foregoing description of Embodiment 2 is directed to a method using Formula 21 to solve for X by use of an algorithm such as ADMM, this is not intended to be limiting. For example, Formula 17 may be solved for X by use of a graph-cut method. That is, the problem of Formula 17 may be solved by regarding this problem as a binary segmentation problem for a long-range beam or a short-range beam. For example, by using, as a seed, a pixel determined to be corresponding to a short-range beam or a long-range beam, an energy function (e.g., Potts Interaction Energy Model) may be defined, and X may be obtained by a min-cut or max-flow algorithm.

As for a pixel for which it is sure that the pixel is irradiated with neither of the beams, the value of |y−wx| may be handled as being greater than or equal to a threshold (e.g., greater than or equal to 0.5). If a pixel irradiated with only a short-range beam has no value, this may be regarded as indicating that at the position of this pixel, no object exists within a distance range corresponding to the short-range beam. If a pixel irradiated with only a long-range beam has no value, this may be regarded as indicating that at the position of this pixel, no object exists within a distance range corresponding to the long-range beam. For a pixel on the image sensor 200 for which an effective observed value exists, whether the corresponding object exists within a short distance range or within a long distance range can be determined by the graph-cut method.

However, the image sensor 200 also includes pixels for which no effective observed value exists. For example, the image sensor 200 also includes a pixel on which no reflection of a light beam is incident, a pixel to which only a short-range beam is projected and for which no corresponding object exists within a predetermined short distance range, and a pixel to which only a long-range beam is projected and for which no corresponding object exists within a predetermined long distance range (i.e., pixels for which the corresponding object is either too close or too far). For these pixels, range data can be created through a procedure described below by using information about pixels for which whether the corresponding object exists within a short distance range or within a long distance range has been determined by the graph-cut method.

Let Z be a vector representing a depth value for each pixel. Z is represented as Z=MX.

$$\min_{Z}\left\{\frac{1}{2}\|AZ - B\|_2^2 + \gamma TV(Z) + \sum_{i=1}^{L} f_{DF}(z_i)\right\} \quad (24)$$

In this regard, the matrix A is an L×L diagonal matrix whose diagonal components corresponding to pixels with depth values determined by the above-mentioned graph-cut method are 1 and whose other components are 0. The vector B is a vector with a number of elements L whose components corresponding to pixels with depth values determined by the above-mentioned graph-cut method have the determined depth values and whose other components are 0. L represents pixel count. TV(MX) is a total variation representing the absolute sum of brightness variations among neighboring regions on the image X.

$f_{DF}(z_i)$ is a constraint for limiting a range (e.g., J. N. Laska et al., "Democracy in Action: Quantization, Saturation, and Compressive Sensing", Applied and Computational Harmonic Analysis, vol. 31, no. 3, pp. 429-443, 2001). $f_{DF}(z_i)$ satisfies the conditions below.

$$f_{DF}(z_i) = \begin{cases} 0, & \text{if pixel } i \text{ includes no object within short distance range } \& \ z_i > R_N \\ \infty, & \text{if pixel } i \text{ includes no object within short distance range } \& \ z_i \leq R_N \\ 0, & \text{if pixel } i \text{ includes no object within long distance range } \& \ 0 < z_i < R_F \\ \infty, & \text{if pixel } i \text{ includes no object within long distance range } \& \ (z_i \geq R_F \text{ or } z_i \leq 0) \\ 0, & \text{if pixel } i \text{ includes no beam } \& \ z_i > 0 \\ \infty, & \text{if pixel } i \text{ includes no beam } \& \ z_i \leq 0 \\ 0, & \text{if pixel } i \text{ has a depth value determined by graph-cut} \end{cases}$$

In this case, the distance range to be measured with short-range beams is greater than 0 and less than or equal to $R_N$, and the distance range to be measured with long-range beams is greater than $R_F$. $\gamma$ represents a weighting factor. Formula 23 can be solved by using, for example, the ADMM mentioned above.

OTHER MODIFICATIONS

In the embodiments and the modification mentioned above, light beams have two kinds of maximum ranges, short and long. Alternatively, light beams may have three or more kinds of maximum ranges. For example, three or more kinds of light beams that differ in energy per unit area on an irradiated surface may be emitted.

In the embodiments and the modification above, light beams with different spatial distributions are radiated sequentially. Alternatively, light beams with the same spatial distribution may be radiated sequentially. For example, light beams with the same two-dimensional spatial distribution may be radiated sequentially. Alternatively, light beams with the same three-dimensional spatial distribution may be radiated sequentially.

In the embodiments and the modification mentioned above, the positioning of beams with various maximum ranges is determined in advance. Alternatively, however, light beams with a spatial pattern that differs for each ranging operation may be used. For example, if information about plural patterns is stored in advance, a pattern may be selected for each ranging operation. The combination of patterns of light beams with various maximum ranges may not need to be determined in advance but may be selected independently. The pattern of beams may be determined every time measurement is performed, or may be specified from an external source through a communication circuit every time measurement is performed.

In the embodiments and the modification mentioned above, predetermined weight information is stored. If the combination of patterns of light beams with various maximum ranges is determined in advance, weight information may be stored for each combination of patterns. If the pattern of light beams with various maximum ranges varies for each ranging operation, weight information may be generated every time a pattern is determined. Alternatively, weight information may be acquired from an external source through a communication circuit every time measurement is performed.

Although, in the embodiments and the modification mentioned above, the light source, the image sensor, the control circuit, and the signal processing circuit are all disposed inside the same range-information acquiring apparatus, these components may not necessarily be disposed inside the same range-information acquiring apparatus. It is to be noted, however, that the light source and the image sensor may be disposed at positions that can be regarded as the same position relative to the distance to be measured. Alternatively, a system may be constructed in which the light source, the image sensor, the control circuit, and the signal processing circuit are connected to each other through communication.

Although, in the embodiments and the modification mentioned above, $x_i$ is a vector representing a distance range for a case where a predetermined range of measurement distances is divided by the number of analyses N, $x_i$ may not necessarily be such a vector. The measurement distance range may or may not be divided into equal parts. Within a measurement range, shorter distances may be divided more finely, and longer distances may be divided more coarsely. This makes it possible to achieve ranging with higher distance resolution for shorter distances and lower distance resolution for longer distances.

In Embodiment 1, the modification of Embodiment 1, and Embodiment 2, beams for measuring long distances are projected first, followed by projection of beams for measuring short distances. The timings of projection and exposure for long-range and short-range beams are determined as follows. That is, if $RL_{min}$ and $RL_{max}$ respectively represent the minimum and maximum values of the range of distances from the light source to be measured with long-range beams, and c represents the velocity of light, the timing of exposure for long-range beams is obtained by dividing, into plural exposure intervals, the period of time from the time corresponding to $2 \times RL_{min}/c$ to the time corresponding to $2 \times RL_{max}/c$ after the start of long-range-beam projection. If $RS_{min}$ and $RS_{max}$ respectively represent the minimum and maximum values of the range of distances from the light source to be measured with short-range beams, and c represents the velocity of light, the timing of exposure for short-range beams is obtained by dividing, into plural exposure intervals, the period of time from the time corresponding to $2 \times RS_{min}/c$ to the time corresponding to $2 \times RS_{max}/c$ after the start of short-range-beam projection.

The timings of projection and exposure for long-range beams and for short-range beams are adjusted such that the above-mentioned timing of exposure for long-range beams and the above-mentioned timing of exposure for short-range beams are the same. That is, long-range beams are projected earlier than short-range beams by an amount of time: greater than or equal to $2 \times RL_{min}/c - 2 \times RS_{min}/c$ and less than or equal to $2 \times RL_{max}/c - 2 \times RS_{max}/c$.
Exposure is started after the elapse of $2 \times RS_{min}/c$ from the start of short-range-beam projection.

For example, the range of distances from the light source to be measured with long-range beams is assumed to be 100 m to 200 m. Further, the range of distances from the light source to be measured with short-range beams is assumed to be 0 m to 100 m. In this case, $RL_{min}$ is 100 m, $RL_{max}$ is 200 m, $RS_{min}$ is 0 m, and $RS_{max}$ is 100 m. In this case, the following holds:

$$2 \times RL_{min}/c = 2 \times RS_{max}/c = 2 \times 100/(3 \times 10^8) \cong 667 \text{ ns}$$

$$2 \times RS_{min}/c = 2 \times 0/(3 \times 10^8) = 0$$

$$2 \times RL_{min}/c - 2 \times RS_{min}/c = 2 \times RL_{max}/c - 2 \times RS_{max}/c \cong 667 \text{ ns} - 0 = 667 \text{ ns}$$

$$2 \times RL_{max}/c = 2 \times 200/(3 \times 10^8) \cong 1334 \text{ ns}.$$

That is, following the projection of long-range beams of light, short-range beams of light are projected after the elapse of 667 ns, which is the time taken for the long-range beams of light to make a round trip of 100 m, and exposure is started simultaneously with the projection of the short-range beams of light.

For a case where the range of distances to be measured with long-range beams, and the range of distances to be measured with short-range beams differ, the following holds, assuming, for example, that the range of distances from the light source to be measured with long-range beams is 100 m to 300 m, and that the range of distances from the light source to be measured with short-range beams is 0 m to 100 m:

$$2 \times RL_{min}/c = 2 \times RS_{max}/c = 2 \times 100/(3 \times 10^8) \cong 667 \text{ ns}$$

$$2 \times RS_{min}/c = 2 \times 0/(3 \times 10^8) = 0$$

$$2 \times RL_{min}/c - 2 \times RS_{min}/c \cong 667 \text{ ns} - 0 = 667 \text{ ns}$$

$$2 \times RL_{max}/c - 2 \times RS_{max}/c \cong 2000 \text{ ns} - 667 \text{ ns} = 1333 \text{ ns}$$

$$2 \times RL_{max}/c = 2 \times 300/(3 \times 10^8) \cong 2000 \text{ ns}.$$

Following the projection of long-range beams of light, short-range beams of light are projected at a time after the elapse of 667 ns, which is the time taken for the long-range beams of light to make a round trip of 100 m, and before the elapse of 1333 ns, and exposure is started simultaneously with the projection of the short-range beams of light. The interval of time for ranging with long-range beams is from 667 ns to 2000 ns. The reflected light of short-range beams is received in one of exposure intervals in which to receive the reflected light of long-range beams.

The technique according to the present disclosure is applicable to a wide variety of apparatuses that perform ranging. For example, the technique according to the present disclosure is applicable to sensing systems that employ light detecting and ranging (LiDAR).

What is claimed is:

1. A range-information acquiring apparatus comprising:
   a light source;
   a photodetector device including a plurality of photodetector elements;
   a control circuit that:
     controls the light source and the photodetector device,
     causes the light source to emit first light toward a scene and subsequently emit second light toward the scene, the first light having a first spatial distribution, the second light having a second spatial distribution, and
     causes at least a portion of the plurality of photodetector elements of the photodetector device to detect first reflected light and second reflected light in a same exposure period, the first reflected light being caused by reflection of the first light from the scene, the second reflected light being caused by reflection of the second light from the scene; and
   a signal processing circuit that, based on photodetection data output from the plurality of photodetector elements of the photodetector device, generates and outputs range data derived from the first reflected light and the second reflected light,
   wherein the signal processing circuit generates the range data from the photodetection data by use of preset weight information.

2. The range-information acquiring apparatus according to claim 1, wherein the second spatial distribution differs from the first spatial distribution.

3. The range-information acquiring apparatus according to claim 1, wherein:
   the at least a portion of the plurality of photodetector elements of the photodetector device includes:
     a plurality of first photodetector elements that receive the first reflected light and do not receive the second reflected light,
     a plurality of second photodetector elements that receive the second reflected light and do not receive the first reflected light, and
     a plurality of third photodetector elements that receive neither the first reflected light nor the second reflected light, and
   the signal processing circuit generates the range data by estimating, based on the photodetector data, range information representing a distance at a position of each of a plurality of pixels corresponding to the plurality of third photodetector elements.

4. The range-information acquiring apparatus according to claim 1, wherein the preset weight information is determined based on the first spatial distribution and the second spatial distribution.

5. The range-information acquiring apparatus according to claim 1, wherein the second light has a radiant intensity lower than a radiant intensity of the first light.

6. The range-information acquiring apparatus according to claim 1,
   wherein the first light includes a plurality of first light beams each emitted in a different direction, and
   wherein the second light includes a plurality of second light beams each emitted in a different direction.

7. The range-information acquiring apparatus according to claim 1, wherein the second light has a maximum range shorter than a maximum range of the first light.

8. The range-information acquiring apparatus according to claim 1, wherein the second light has an energy per unit area on an irradiated surface lower than an energy of the first light per unit area on the irradiated surface, the irradiated surface being spaced apart from the light source.

9. The range-information acquiring apparatus according to claim 6,
   wherein the first light has a first wavelength,
   wherein the second light has a second wavelength, and
   wherein the second wavelength has an atmospheric absorption coefficient higher than an atmospheric absorption coefficient of the first wavelength.

10. The range-information acquiring apparatus according to claim 7,
   wherein the control circuit causes the light source to emit third light toward the scene after emission of the second light, the third light having a third spatial distribution, and causes the photodetector device to detect third reflected light in the same exposure period, the third reflected light being caused by reflection of the third light from the scene, and
   wherein the third light has a maximum range shorter than the maximum range of the second light.

11. The range-information acquiring apparatus according to claim 1, wherein the exposure period
does not include a time at which a portion of the first reflected light arrives at the photodetector device, the portion of the first reflected light being caused by reflection at a position in the scene located at a first distance from the photodetector device,
includes a time at which another portion of the first reflected light arrives at the photodetector device, the other portion of the first reflected light being caused by reflection at a position located at a second distance from the photodetector device, the second distance being greater than the first distance, and
includes a time at which a portion of the second reflected light arrives at the photodetector device, the portion of the second reflected light being caused by reflection at a position located at the first distance from the photodetector device.

12. A range-information acquiring apparatus comprising:
a light source;
a photodetector device including a plurality of photodetector elements;
a control circuit that:
controls the light source and the photodetector device,
causes the light source to emit first light toward a scene and subsequently emit second light toward the scene, the first light having a first spatial distribution, the second light having a second spatial distribution, and
causes at least a portion of the plurality of photodetector elements of the photodetector device to detect first reflected light and second reflected light in a same exposure period, the first reflected light being caused by reflection of the first light from the scene, the second reflected light being caused by reflection of the second light from the scene; and
a signal processing circuit that, based on photodetection data output from the plurality of photodetector elements of the photodetector device, generates and outputs range data derived from the first reflected light and the second reflected light, wherein:
the at least a portion of the plurality of photodetector elements of the photodetector device includes:
a plurality of first photodetector elements that receive the first reflected light and do not receive the second reflected light,
a plurality of second photodetector elements that receive the second reflected light and do not receive the first reflected light, and
a plurality of third photodetector elements that receive neither the first reflected light nor the second reflected light, and
the signal processing circuit generates the range data by estimating, based on the photodetector data, range information representing a distance at a position of each of a plurality of pixels corresponding to the plurality of third photodetector elements.

13. A range-information acquiring apparatus comprising:
a light source;
a photodetector device including a plurality of photodetector elements;
a control circuit that:
controls the light source and the photodetector device,
causes the light source to emit first light toward a scene and subsequently emit second light toward the scene, the first light having a first spatial distribution, the second light having a second spatial distribution, and
causes at least a portion of the plurality of photodetector elements of the photodetector device to detect first reflected light and second reflected light in a same exposure period, the first reflected light being caused by reflection of the first light from the scene, the second reflected light being caused by reflection of the second light from the scene; and
a signal processing circuit that, based on photodetection data output from the plurality of photodetector elements of the photodetector device, generates and outputs range data derived from the first reflected light and the second reflected light, wherein:
the first light includes a plurality of first light beams each emitted in a different direction,
the second light includes a plurality of second light beams each emitted in a different direction,
the first light has a first wavelength,
the second light has a second wavelength, and
the second wavelength has an atmospheric absorption coefficient higher than an atmospheric absorption coefficient of the first wavelength.

14. A range-information acquiring apparatus comprising:
a light source;
a photodetector device including a plurality of photodetector elements;
a control circuit that:
controls the light source and the photodetector device,
causes the light source to emit first light toward a scene and subsequently emit second light toward the scene, the first light having a first spatial distribution, the second light having a second spatial distribution, and
causes at least a portion of the plurality of photodetector elements of the photodetector device to detect first reflected light and second reflected light in a same exposure period, the first reflected light being caused by reflection of the first light from the scene, the second reflected light being caused by reflection of the second light from the scene; and
a signal processing circuit that, based on photodetection data output from the plurality of photodetector elements of the photodetector device, generates and outputs range data derived from the first reflected light and the second reflected light,
wherein the exposure period
does not include a time at which a portion of the first reflected light arrives at the photodetector device, the portion of the first reflected light being caused by reflection at a position in the scene located at a first distance from the photodetector device,
includes a time at which another portion of the first reflected light arrives at the photodetector device, the other portion of the first reflected light being caused by reflection at a position located at a second distance from the photodetector device, the second distance being greater than the first distance, and
includes a time at which a portion of the second reflected light arrives at the photodetector device, the portion of the second reflected light being caused by reflection at a position located at the first distance from the photodetector device.

* * * * *